US006217970B1

(12) United States Patent
Arita et al.

(10) Patent No.: US 6,217,970 B1
(45) Date of Patent: Apr. 17, 2001

(54) MAGNETIC RECORDING MEDIUM, METHOD OF PRODUCING THE SAME, AND RECORDING AND READING-OUT METHOD

(75) Inventors: Yoji Arita; Yuzo Seo; Ryuichi Yoshiyama; Junichi Kozu; Toshihiko Kuriyama; Mitsunori Mochida, all of Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/306,909

(22) Filed: May 7, 1999

Related U.S. Application Data

(62) Division of application No. 08/937,045, filed on Sep. 24, 1997, now Pat. No. 5,928,759, which is a continuation of application No. 08/491,330, filed on Jun. 30, 1995, now abandoned.

(30) Foreign Application Priority Data

| Jul. 4, 1994 | (JP) | 6-152131 |
| Sep. 7, 1994 | (JP) | 6-213928 |
| Oct. 5, 1994 | (JP) | 6-241369 |
| Nov. 16, 1994 | (JP) | 6-288180 |
| Nov. 22, 1994 | (JP) | 6-288092 |
| Nov. 28, 1994 | (JP) | 6-293294 |
| Nov. 28, 1994 | (JP) | 6-293295 |
| Nov. 28, 1994 | (JP) | 6-293296 |
| Nov. 29, 1994 | (JP) | 6-295072 |
| Nov. 29, 1994 | (JP) | 6-295075 |
| Nov. 29, 1994 | (JP) | 6-295077 |
| Dec. 27, 1994 | (JP) | 6-325871 |
| Apr. 17, 1995 | (JP) | 7-90712 |
| Apr. 21, 1995 | (JP) | 7-96993 |

(51) Int. Cl.$^7$ ................................................. G11B 5/60
(52) U.S. Cl. .................... 428/65.3; 428/694 TR; 428/900; 360/97.01; 360/103; 360/135
(58) Field of Search .................. 360/97.01, 135, 360/103; 428/65.3, 694 TR, 900

(56) References Cited

U.S. PATENT DOCUMENTS

| 4,725,472 | 2/1988 | Okabe et al. . |
| 4,839,217 | 6/1989 | Tabata et al. . |
| 4,869,090 | 9/1989 | Tada et al. . |
| 5,062,021 | 10/1991 | Ranjan et al. . |
| 5,082,709 | 1/1992 | Suzuki et al. . |
| 5,108,781 | 4/1992 | Ranjan et al. . |
| 5,139,849 | 8/1992 | Takagi et al. . |
| 5,169,703 | 12/1992 | Miyazaki et al. . |
| 5,236,763 | 8/1993 | Luthi . |
| 5,268,207 | 12/1993 | Kruger et al. . |
| 5,417,896 | 5/1995 | Fischer et al. . |
| 5,474,830 | 12/1995 | Yamaguchi et al. . |
| 5,504,646 | * 4/1996 | Tanaka et al. ................ 360/135 |
| 5,528,922 | 6/1996 | Baumgart et al. . |
| 5,540,973 | 7/1996 | Onodena et al. . |
| 5,549,954 | 8/1996 | Otsuka et al. . |
| 5,550,696 | 8/1996 | Nguyen . |
| 5,586,040 | 12/1996 | Baumgart et al. . |
| 5,635,269 | * 6/1997 | Weir et al. ................... 428/65.3 |
| 5,768,076 | 6/1998 | Baumgart et al. . |
| 5,798,164 | * 8/1998 | Weiss et al. .................. 428/141 |
| 5,870,265 | * 2/1999 | Boutaghou ................... 360/135 |
| 6,057,984 | * 5/2000 | Arita et al. ................... 360/103 |

FOREIGN PATENT DOCUMENTS

| 3213352 C2 | 11/1982 | (DE) . |
| 3415836 A1 | 10/1984 | (DE) . |
| 3830132 C2 | 6/1989 | (DE) . |
| 4014107 A1 | 11/1990 | (DE) . |
| 0585606 A1 | 3/1994 | (EP) . |

OTHER PUBLICATIONS

C. Field, Patent Abstracts of Japan, 14:143, Mar. 19, 1990.
C. Field, Patent Abstracts of Japan, 10:243, Aug. 21, 1986.

\* cited by examiner

Primary Examiner—Stevan A. Resan
(74) Attorney, Agent, or Firm—Dike, Bronstein, Roberts & Cushman, LLP; David G. Conlin; William J. Daley, Jr.

(57) ABSTRACT

The disclosure describes a magnetic recording medium having at least a magnetic layer, optionally by means of an under layer, on a non-magnetic substrate, wherein projections formed by irradiation of an energy beam and each having a height from 1 to 60 nm are provided at the number of $10^2$ to $10^8$ per 1 $mm^2$ on the surface of any one of the non-magnetic substrate, the under layer, the magnetic layer and the magnetic recording medium.

6 Claims, 7 Drawing Sheets

MAGNETIC RECORDING MEDIUM, METHOD OF PRODUCING THE SAME, AND RECORDING AND READING-OUT METHOD

This application is a divisional of U.S. application Ser. No. 08/937,045, filed Sep. 24, 1997 (now U.S. Pat. No. 5,928,759) which is a continuation of 08/491,330 filed Jun. 30, 1995 (abandoned), the teachings of which are incorporated herein by reference.

BACKGROUND OF THE INVENTION

The present invention relates to a magnetic recording medium, a method of producing the same, and a recording/reading-out method. The magnetic recording medium according to the present invention comprises at least a magnetic layer, optionally by means of an under layer, on a non-magnetic substrate, which has a satisfactory CSS (contact start and stop) characteristic and excellent sticking property of the magnetic head to the surface of the magnetic recording medium, and which can lower a flying height of the magnetic head.

Usually, information is written into and read out of a magnetic recording medium (disc) by means of a magnetic head, in which the disc is moved at a high speed to rise the magnetic head on the surface of the magnetic recording medium. In the disc, fabrication for applying mechanical polishing treatment has been applied to leave a fabrication traces (hereinafter referred to as 'mechanical texture') for improving a magnetic characteristic. Usually, the mechanical texture is applied on the surface of the non-magnetic substrate or on an under layer such as an NiP plated or sputtered layer disposed thereon.

Along with the recent demand for increasing the amount of information, and for miniaturizing and the lightweighting the device, the linear recording density and track density are increased, so that scratches caused by the existent mechanical texture result in an error at a high probability if the area per one bit is decreased.

Accordingly, it has been proposed a method of applying the mechanical texture only in a CSS region of the disc while leaving a data recording region as it is stand, but the surface of the data recording region is made higher than the height for the surface of the CSS region to bring about a problem that the magnetic head crushes upon seeking.

Further, a method of preparing a texture pattern by laser beam has also been proposed instead of the mechanical texture. For instance, U.S. Pat. Nos. 5,062,021 and 5,108,781 propose an attempt of locally melting or fusing an NiP layer by a Q switch laser beam of Nd-YAG, in which a pulse width is very narrow and an energy density is very high, and forming a center depression surrounded by a circular raised rim, thereby improving the CSS characteristic with respect to the magnetic head by the formed circular rim.

However, in the above-mentioned method, the contacting area with respect to a lower surface of the magnetic head is not decreased outstandingly, and it can not be said that the problem of sticking between the magnetic head and the disc is improved more as compared with the mechanical texture.

Further, a method of forming projections by using photolithography has also been proposed. For instance, a pretext for Tribology by published in The Japan Society of Tribologists (1991-5, A-11), (1992-10, B-6) shows the result of a CSS test for a disc having concentric projections formed by photolithography at 0.1 to 5% area ratio relative to the entire surface of the disc.

However, since the top of the projection is flat in the above-mentioned method, it involves a drawback that the frictional force is increased along with the sliding cycles of the magnetic head and that industrial application is not easy.

As a result of the present inventors' earnest studies, it has been found that by irradiating, to the surface of a non-magnetic substrate, a magnetic layer, an under layer or a magnetic medium, an energy beam that moves relatively to the said surface thereof and melting locally the said surface thereof, thereby forming projections on the surface, the thus obtained magnetic recording medium, wherein projections formed by irradiation of the energy beam and having a height of 1 to 60 nm are provided at the number of $10^2$ to $10^8$ per 1 $mm^2$ on the surface of any one of the non-magnetic substrate, the under layer, the magnetic layer and the magnetic recording medium, is capable of preventing a magnetic head from sticking and reducing fluctuations for stable flying height of the magnetic head when the magnetic head seeks between the data recording region and the CSS region, and causing neither head crush nor instabilization of the magnetic head in a space. The present invention has been attained on the basis of the above-mentioned finding.

SUMMARY OF THE INVENTION

The object of the present invention is to provide a magnetic recording medium capable of preventing a magnetic head from sticking by decreasing the area at the top end of a projection, and reducing fluctuations for the stable flying height of the magnetic head when the magnetic head seeks between the data recording region and the CSS region, and causing neither head crush nor instabilization of the magnetic head in a space.

To accomplish the aims, in a first aspect of the present invention, there is provided a magnetic recording medium having at least a magnetic layer, optionally by means of an under layer, on a non-magnetic substrate, wherein projections formed by irradiation of an energy beam and each having a height from 1 to 60 nm are provided at the number of $10^2$ to $10^8$ per 1 $mm^2$ on the surface of any one of the non-magnetic substrate, the under layer, the magnetic layer and the magnetic recording medium.

In a second aspect of the present invention, there is provided a magnetic recording medium having at least a magnetic layer, optionally by means of an under layer on a non-magnetic substrate, wherein projections formed by irradiation of an energy beam and each having a height from 1 to 60 nm are provided at the number of $10^2$ to $10^8$ per 1 $mm^2$ on the surface of any one of the non-magnetic substrate, the under layer, the magnetic layer and the magnetic recording medium, and a depression formed by irradiation of the energy beam is present adjacent to each of the projections at the scanning direction of the energy beam.

In a third aspect of the present invention, there is provided a magnetic recording medium having at least a magnetic layer, optionally by means of an under layer, on a non-magnetic substrate, wherein concentric fabrication traces are formed by mechanical texturing on the surface of the non-magnetic substrate or the surface of the under layer, and projections are formed by irradiation of an energy beam on the surface of any one of the non-magnetic substrate, the under layer, the magnetic layer and the magnetic recording medium of a CSS (contact start and stop) region.

In a fourth aspect of the present invention, there is provided a method of producing a magnetic recording medium having at least a magnetic layer, optionally by means of an under layer, on a disc-like non-magnetic substrate, which comprises irradiating, to the surface of the non-magnetic substrate, the magnetic layer, the under layer or the magnetic recording medium, an energy beam that moves relatively to said surface; locally melting the surface under such a condition that a melting width in a direction orthogonal to the relative moving direction of the energy beam on the surface thereof is less than 5 μm; forming projections on the said surface; and then forming required films of the under layer, the magnetic layer or a protective layer.

In a fifth aspect of the present invention, there is provided a method of producing a magnetic recording medium having at least a magnetic layer and a protective layer on the surface of a non-magnetic substrate, an under layer being optionally disposed between the non-magnetic substrate and the magnetic layer, and a lubricating layer being optionally disposed on the protective layer, which comprises irradiating an energy beam on the surface of the protective layer or the lubricating layer; and melting or softening the surface of the magnetic layer, the under layer or the non-magnetic substrate by locally heating the same, thereby forming projections on the magnetic layer, the under layer or the substrate.

In a sixth aspect of the present invention, there is provided a recording/reading-out method of writing and reading data to and from a magnetic disc by a magnetic head by a contact start and stop (CSS) system, wherein the magnetic disc has projections in a CSS region in which the magnetic head conducts a CSS operation, the height of the projections being reduced toward a data recording region, the magnetic head lowers to the surface of the magnetic disc and rises from the surface of the magnetic disc in the CSS region in which projections at a height lower than the average height of the projections are present or in a CSS region with no presence of projections neighboring a region in which the projections are present, and the magnetic head stops stationary in a CSS region in which projections each having a height greater than the average height of the projections are present.

BRIEF DESCRIPTION OF THE DRAWINGS

FIG. 1 to FIG. 3 are explanatory views illustrating the shape of a projection on the surface of NiP layer in Example 9 of the present invention. More in details, they are explanatory views illustrating the shape of a projection formed on the surface of an NiP layer on a disc substrate and measured by a surface shape-measuring device utilizing laser beam interference (for example, ZYGO (trade name), manufactured by ZYGO CORP. in U.S.A), under the condition of using FIZEAU×100 as an objective lens and 512 CAMERA as the detecting element, in which FIG. 1 is a perspective view, FIG. 2 is a vertical cross sectional view of a plane passing through the center of the projection and in parallel with a laser beam scanning direction of the laser beam, and FIG. 3 is a cross sectional view passing through the center of the projection and in an orthogonal direction in FIG. 2.

FIG. 7(a) shows a state of starting irradiation of the energy beam, FIG. 7(b) shows a state just before completing the irradiation of the energy beams and FIG. 7(c) shows a cross sectional shape of the projection and the periphery thereof. In FIG. 7(a), FIG. 7(b) and FIG. 7(c), either a rightward or leftward horizontal direction shows a rotational direction of the projection-forming surface.

DETAILED DESCRIPTION OF THE INVENTION

Figure 1:
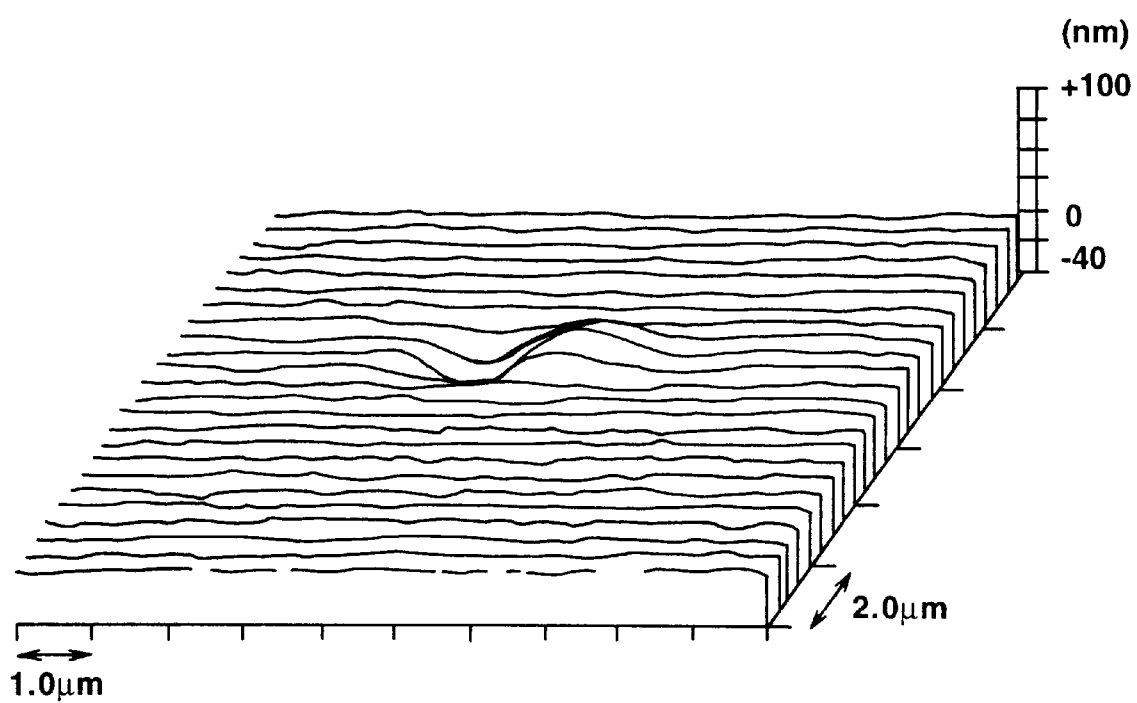

A magnetic recording medium according to the present invention will at first be explained.

The magnetic recording medium of the present invention comprises at least a magnetic layer, optionally by means of an under layer, on a non-magnetic substrate. In the following descriptions, the non-magnetic substrate is sometimes referred to simply as 'substrate'. As the substrate used in the present invention, a disc-type substrate and other shaped substrate such as card-type substrate (rectangular substrate), etc. may be exemplified.

In the present invention, an aluminum alloy substrate, a glass substrate or a silicon substrate can be used suitably as the substrate, but a substrate composed of other metal such as copper and titanium, a ceramic substrate or a resin substrate may also be used. For the silicon substrate, a pure silicon substrate, as well as a silicon alloy substrate containing a trace amount of elements for increasing the strength can be used.

The magnetic recording medium can be constituted by forming the magnetic layer directly on the surface of the substrate, but the magnetic layer is preferably formed by means of an under layer formed on the surface of the substrate. As the under layer, a non-magnetic under layer composed of an NiP alloy is suitable and such an under layer is formed usually by electroless plating or sputtering method. The thickness of the under layer is, usually, from 50 to 20,000 nm, preferably from 100 to 15,000 nm.

An intermediate layer such as a Cr layer or a Cu layer is preferably disposed between the substrate or the under layer and the magnetic layer. The thickness of the intermediate layer is, usually from 20 to 200 nm, preferably from 50 to 100 nm. The magnetic recording layer comprises a ferromagnetic thin alloy film such as composed of Co—P, Co—Ni—P, Co—Ni—Cr, Co—Ni—Pt, Co—Cr—Ta, Co—Cr—Pt or Co—Cr—Ta—Pt-based alloy and is formed, for example, by electroless plating, electric plating, sputtering or vapor deposition method. The thickness of the magnetic recording layer is usually about from 30 to 70 nm.

A protective layer is preferably disposed on the surface of the magnetic recording layer. The protective layer comprises a carbon film, a hydrogenated carbon film, carbide film such as composed of TiC or SiC, a nitride film such as composed of SiN or TiN, or an oxide film such as composed of SiO, $Al_2O_3$, ZrO, and is formed by a method, for example, vapor deposition method, sputtering method, plasma CVD method, ion plating method and wetting process. As the protective layer, the carbon film or the hydrogenated carbon film is more preferred.

Further, a lubricant layer is preferably disposed on the surface of the protective layer. However, in a case of using a magnetic head having a diamond-like carbon layer on a slider surface, it is not always necessary for providing the protective layer, since tribologic property between the magnetic head and the magnetic recording medium is improved.

For the lubricant, for example, a liquid fluorocarbon-based lubricant is used suitably and the lubricant layer is usually formed on the surface of the protective layer, for example, by dipping method.

In the magnetic recording medium according to the present invention, projections are formed by irradiation of an energy beam on the surface of the substrate, the under layer, the magnetic layer or the magnetic recording medium. The surface on which the projections are formed, means a side in contact with the magnetic head.

The substrate is usually used after applying mirror finishing (polishing) treatment. In a case of using a substrate applied with the under layer (for example, an electroless Ni—P plated under layer), the mirror finishing treatment is applied to the surface of the under layer. Further in a case of using the substrate, a slight mechanical texture can be applied previously to the entire surface of the substrate to form low projection. Such mechanical texture can provide the following advantageous effects.

That is, also in a case where the height or the density of projections formed by the energy beam are low or small, that is, in a state in which the magnetic recording medium and the magnetic head are partially in contact with each other, sticking is less caused and frictional coefficient is reduced as compared with a case of using a simply mirror-finished substrate. Further, since projection-forming conditions to be described later can be selected from a wide range, it is particularly preferred to mass production.

A magnetic recording medium in the first aspect of according to the present invention comprises at least a magnetic layer, optionally by means of an under layer, on a non-magnetic substrate, wherein projections formed by irradiation of an energy beam and each having a height of 1 to 60 nm are provided at the number of $10^2$ to $10^8$ per 1 $mm^2$ in the surface of any one of the non-magnetic substrate, the under layer, the magnetic layer and the magnetic recording medium.

The height of the projection represents a height of a projection on the basis of a center line for a roughness curve according to JIS surface roughness (B 0601-1982), and the density of the projections (Numbers/$mm^2$) means not an average density over the entire magnetic recording medium, but a density per unit area in a region in which the projections are present.

Generally, if the height of the projection exceeds 60 nm, a CSS characteristic is satisfactory but the stable flying height of the head can not be reduced. Further, if the height of the projection is less than 1 nm, the projection is buried in a fine unevenness inherent to the substrate, thereby failing to attain an intended advantageous effect.

Further, if the density of the projection is less than $10^2$ Numbers/$mm^2$ (=N/$mm^2$), it is difficult to support the lower surface of the head only by the projection because of undulation or the like of the substrate. On the other hand, if the density of the projection exceeds $10^8$ (N/$mm^2$), it is difficult to make the height of the projections uniform.

In the magnetic recording medium in the first aspect of the present invention, a preferred height of the projection is from 10 to 60 nm and a preferred density of the projection is from $10^3$ to $10^8$ (N/$mm^2$). More preferred density of the projection is from $10^3$ to $10^6$ (N/$mm^2$). Further, the required density of the projection depends on the surface property of the magnetic recording medium, and even a small density of projection can provide a sufficient effect in a case of a substrate such as a silicon substrate having less undulation and small surface roughness.

Further, it is preferred that a depression formed by irradiation of the energy beam upon forming the projection is present in a scanning direction of the energy beam at each of the projections in contiguous with the projection. In case of using the disc substrate, the scanning direction of the energy beam is preferably a circumferential direction. It is preferred in view of the productivity thereof that the energy beam is irradiated rotating the disc substrate. However, as the scanning direction of the energy beam, other directions, for example, a radius direction of the disc substrate, etc. may be adopted. Also, the energy beam may be periodically moved between an inner circumference and an outer circumference of CSS region in the disc substrate at the radius direction. In this case, the scanning of the energy beam can produce a sine waveform at the circumferential direction.

Figure 2:
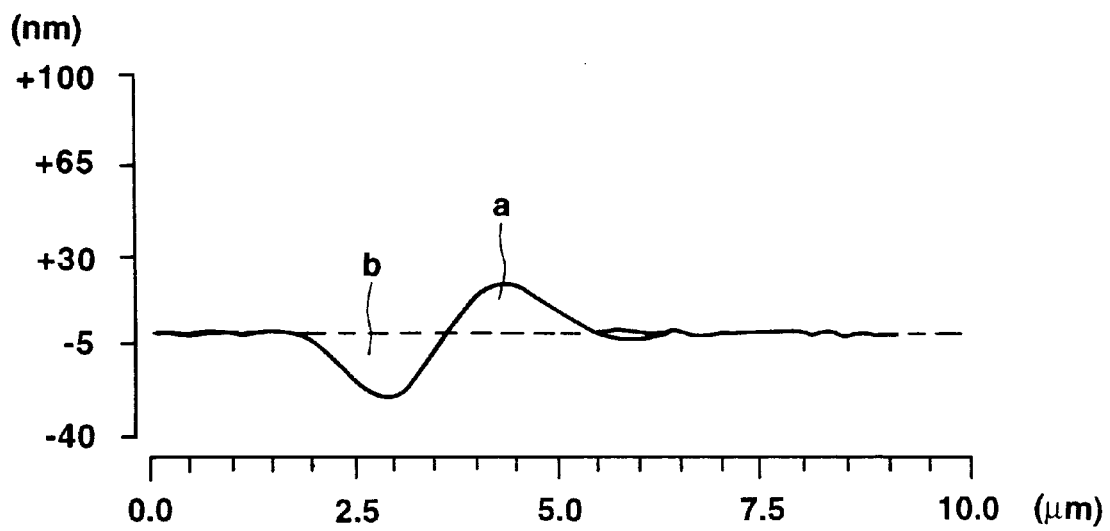
Figure 3:
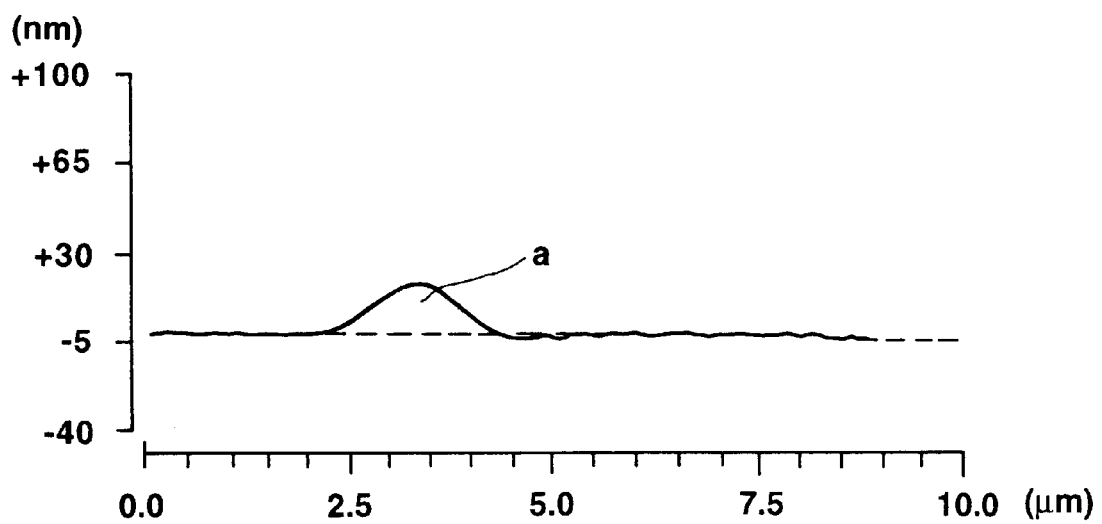

FIG. 1–FIG. 3 are explanatory views illustrating the shape of a projection on the surface of the NiP layer disposed on the disc substrate in Example 9, which is measured by a surface shape-measuring device utilizing laser beam interference (for example, ZYGO (trade name) manufactured by ZYGO Corp. in U.S.A.). More specifically, FIG. 1 is a perspective view, FIG. 2 is a vertical cross sectional view of a plane passing through the center of the projection and in parallel with a laser beam scanning direction, and FIG. 3 is a vertical cross sectional view of a plane passing through the center of the projection and in an orthogonal direction of FIG. 2.

From each of the figures, it is apparent that a depression (b) formed in the circumferential direction (scanning direction of the energy beam) is present in contiguous with a projection (a). Also, it is apparent that the projection (a) is not encircled with the depression (b). Further, it is preferred that the top of the projection formed by the irradiation of the energy beam is not flat but has a moderate radius of curvature, and that the shape of a cross section of the projection in parallel with the surface of the magnetic recording medium is substantially circular. The magnetic recording medium in which such specified projections are formed, has a reduced contacting area between the lower surface of the magnetic head and the surface of the magnetic recording medium, so that friction upon CSS operation can be decreased extremely and the magnetic head can be prevented from sticking to the surface of the magnetic recording medium.

Further, the projections are usually formed to a region in which the magnetic head conducts the CSS operation. In this case, projections are preferably formed such that the height is reduced toward the data recording region. In such an embodiment, the head can seek stably from a data recording region to the CSS region or in an opposite direction. Such an effect can be attained also by decreasing the density of the projections toward the data recording region. Accordingly, it is more preferred to decrease both of the height of the projections and the density of the projections toward the data recording region, still more preferably to decrease gradually both of the height of the projections and the density of the projections toward the data recording region. Then, in an embodiment in which the projections described above are not produced to the data recording region, since the surface of the magnetic recording medium can be smoothed as much as possible in the data recording region, errors due to scratches can be reduced. Particularly, by reflecting the characteristics of the highly smooth surface of the silicon substrate as the surface property of the recording magnetic recording medium, the high density recording of the magnetic recording medium can be attained by lowering the flying height of the magnetic head. In addition, a slight texture or the like only for the purpose of orientating the magnetic layer can be adopted in the data recording region, to make the surface more smooth. Accordingly, the disadvantage caused by existent mechanical texture that is applied with an aim of improving CSS, that is, errors due to scratches can be reduced.

However, the projections may be formed not only in the CSS region but also in the data recording region. This can prevent the magnetic head from sticking, for example, in a state in which the magnetic head stops on the data recording region. In this case, it is preferred that the height of the projections in the data recording region is lower than the height of the projections in the CSS region and it is preferred that the density of the projections in the data recording region is smaller than the density of the projections in the CSS region.

In accordance with the magnetic recording medium in the first aspect of the present invention, projections each having 1 to 60 nm in height are provided by the number of $10^2$ to $10^8$ per 1 mm$^2$ and such a magnetic recording medium can be obtained by irradiating, on the projection-forming surface, an energy beam that moves relatively to the surface under the conditions at a beam power of 50 to 500 mW, for an average irradiation time from 0.05 to 100 $\mu$sec, with a spot diameter for the energy beam from 0.2 to 4 $\mu$m and at a linear velocity of the substrate from 0.8 to 15 m/sec. Then, laser beam is used preferably as the energy beam. The spot diameter for the energy beam means a diameter of $1/e^2$ in which 84% of the energy beam is concentrated, wherein e represents a bottom of a naturalized logarithm A magnetic recording medium in the second aspect of according to the present invention comprises at least a magnetic layer, optionally by means of an under layer, on a non-magnetic substrate, wherein projections formed by irradiation of an energy beam and each having a height from 1 to 60 nm are provided at the number of $10^2$ to $10^8$ per 1 mm$^2$ on the surface of any one of the non-magnetic substrate, the under layer, the magnetic layer and the magnetic recording medium, and a depression formed by the irradiation of the energy beam is present adjacent to each of the projections at the scanning direction.

In the magnetic recording medium in the second aspect of the present invention, the height of the projections is preferably from 10 to 60 nm, more preferably from 10 to 40 nm. The density of the projections is preferably from $10^3$ to $10^6$ (N/mm$^2$). The meanings for the definition of the height of the projections and the density of the projections are the same as those for the magnetic recording medium in the first aspect. Further it is also identical for the meaning of the presence of the depression formed in the scanning direction of the energy beam. In case of using the disc substrate, the scanning direction of energy beam is preferably a circumferential direction. Further, it is preferred that a ratio (d/h) of the depth (d) of the depression to the height (h) of the projection is 0.1 to 3, more preferably 0.5 to 2.

In the magnetic recording medium in the second aspect of the present invention, it is preferred that the average area of a figure surrounded with a contour line at a height 1 nm below the top of each of the projections (herein after referred to as 'contour line area (1)') is not more than 2 $\mu$m$^2$. If the contour line area (1) exceeds 2 $\mu$m$^2$, sticking tends to occur between the magnetic recording medium and the magnetic head. Generally, the contour line area (1) is preferably within a range from 0.001 to 1.0 $\mu$m$^2$, more preferably within a range from 0.001 to 0.5 $\mu$m$^2$ and, still more preferably within a range from 0.001 to 0.2 $\mu$m$^2$. The counter line area (1) can be measured by a surface shape measuring device utilizing laser beam interference.

The magnetic recording medium in the second aspect the present invention includes several preferred embodiments as described later by satisfying the definition for the contour line area (1).

In the first embodiment, the average area of the figure surrounded with a contour line at a half height of the projection (hereinafter referred to as 'contour line area (2)') is preferably not more than 10 $\mu$m$^2$. That is, although undesired effects may sometimes be given on the CSS characteristic depending on the lubricant used, the CSS characteristic can be improved by satisfying the above-mentioned conditions. The contour line area (2) is preferably not more than 5 $\mu$m$^2$, more preferably not more than 2 $\mu$m$^2$. The preferred lower limit of the contour line area (2) is 0.01 $\mu$m$^2$. The contour line area (2) can be measured by a surface shape-measuring device utilizing laser beam interference.

In a second embodiment, a figure surrounded with a contour line at a half height of the projection, preferably has such a shape that the length orthogonal to the scanning direction of the energy beam (i.e., radial length) is longer than the length of the scanning direction of the energy beam (i.e., circumferential length). Specifically, in the FIG. surrounded with the contour line at a half height of the projection, the ratio of the circumferential length of the scanning direction to the radial length orthogonal to the scanning direction is usually from 0.2 to 0.7, preferably from 0.3 to 0.5.

In a third embodiment, a figure surrounded with a contour line at a half height for the height of the projection is preferably a half moon- or crescent-like shape. The projection of such a shape is more steep in a relative running direction between the magnetic head and the magnetic medium, which is considered to provide an effect of preventing adsorption of the magnetic head to the surface of the magnetic recording medium caused by the lubricant.

In a fourth embodiment, it is preferred that the contour line area (1) is not more than 0.5 $\mu$m$^2$, the contour line area (2) is not more than 3 $\mu$m$^2$ and the shape of a cross section of the projection in parallel with the surface of the magnetic recording medium is substantially circular. In this embodiment, it is preferred that the height of the projections is from 1 to 40 nm and the density of the projections is 10 to $10^8$ (N/mm$^2$). Further, the counter line area (1) is preferably not more than 0.3 $\mu$m$^2$ and, more preferably, not more than 0.2 $\mu$m$^2$ and, particularly preferably, not more than 0.1 $\mu$m$^2$. The preferable lower limit of the counter line area (1) is 0.001 $\mu$m$^2$. On the other hand, the contour line area (2) is preferably not more than 2 $\mu$m$^2$, more preferably not more than 1 $\mu$m$^2$. The preferable lower limit of the counter line area (2) is 0.01 $\mu$m$^2$. In the forth embodiment, not only the sticking can be prevented to facilitate the CSS operation but also the cross sectional shape of the projection is substantially circular and the shape of the projection is sharp, so that an effect of preventing adsorption of the magnetic head to the surface of the magnetic recording medium can be provided irrespective of the kind of the lubricant or an affection of humidity.

The above-mentioned figure (cross sectional shape) surrounded with the contour line at a half height of the projection is controlled by, for example, a scanning period of the energy beam. According as the scanning period becomes longer, the figure changes in order a crescent-like shape, a half moon-like shape and a circular-like shape.

In other embodiment of the magnetic recording medium in the second aspect of the present invention, the aspect ratio (major axis diameter/minor axis diameter) of the cross section at the bottom of the projection is preferably not less than 2, irrespective whether the condition for the contour line area (1) is satisfied or not. In this embodiment, the height of the projection is preferably within a range from 1 to 30 nm. Then, the aspect ratio of the cross section at the bottom of the projection is preferably not less than 10. The preferable upper limit of the aspect ratio of the cross section at the bottom of the projection is 20 to 50. Further, a minor axis diameter of the cross section surrounded with the contour line at a height 1 nm below the top of the projection is preferably not more than 0.5 $\mu$m. The preferable lower limit of the minor axis diameter of the cross section surrounded with the contour line at a height 1 nm below the top is 0.01 $\mu$m. The minor axis diameter can be measured by a surface shape-measuring device by laser beam interference. Further, the projections are preferably disposed such that respective major axis thereof are substantially in parallel with each other. Specifically, the projections are preferably formed such that the major axis are directed in the scanning direction of the energy beam (i.e., circumferential direction) of the magnetic recording medium and the respective major axis are substantially in parallel with each other. In this case, the number of the projections is preferably 1 to $10^3$, more preferably 10 to $10^{10}$, still more preferably 5 to 50 per 1 mm length in the radial direction of the magnetic recording medium in a portion in which the projections are present.

In any of the embodiments described above of the magnetic recording medium in the second aspect of the present invention, the projections are preferably formed in a region in which the magnetic head conducts the CSS operation like that the magnetic recording medium of the first aspect and it is further preferred that the projection are formed such that the height is decreased toward the data recording region. It is also preferred that the density of the projections is decreased toward the data recording region and it is further preferred that the height of the projections and the density of the projections are decreased toward the data recording region. The meanings of the above-mentioned definitions are the same as those in the magnetic recording medium in the first aspect.

Usually, an innermost circumference of the magnetic recording medium is used for the CSS region. By the way, CSS for a clock magnetic head for writing clock signals used upon writing servo data is sometimes disposed to the outermost circumference. In such a case, it is effective to provide the projections also to the outermost circumference of the magnetic recording medium.

In other embodiment of the magnetic recording medium in the second aspect of the present invention, it is preferred that long projections in which an aspect ratio of the cross section at the bottom of the projection is not less than 3, and short projections in which an aspect ratio of the cross section at the bottom of the projection is more than 1 and less than 3, are present in a region in which the magnetic head conducts the CSS operation irrespective whether the condition for the contour line area (1) described above is satisfied or not, the long projections are present at a greater ratio in the CSS region neighboring the data recording region (landing region of the magnetic head), the short projections are present at a greater ratio in the CSS region neighboring the inner circumference of the magnetic recording medium (disc), and the height of the projection is decreased toward the data recording region. The long projections and the short projections may be present together in the CSS region, or the long projections and the short projections are separately disposed such that only the long projections are present in the CSS region neighboring the data recording region, while only the short projections are present in the CSS region neighboring the inner circumference of the disc.

The disc described above is suitably used to a recording/reading-out method by the CSS system by the following CSS system, that is, the magnetic head is lowered to and risen from the disc in a CSS region neighboring the data recording region in which the long projections are present at a greater ratio (landing region of the magnetic head) and the magnetic head is set stationary in the CSS region neighboring the inner circumference of the disc in which the short projections are present at a smaller ratio. However, movement of the magnetic disc to the CSS region neighboring the inner circumference of the disc with a greater height of projections may be conducted also immediately under the stopping of the disc, before that it the magnetic head causes sticking. This means that the movement of the magnetic head is conducted accompanying the rotation of the disc at a low speed and the stopping of the magnetic head is conducted at a final stationary state.

A recording medium in the third aspect of the present invention comprises at least a magnetic layer, optionally by means of an under layer, on a disc-like non-magnetic substrate, wherein concentric fabrication traces are formed by mechanical texturing on the surface of the non-magnetic substrate or the surface of the under layer of a data recording region, and projections are formed by irradiation of an energy beam on the surface of any one of the non-magnetic substrate, the under layer, the magnetic layer and the magnetic recording medium in the CSS region. In such a magnetic recording medium, the height of the projection is preferably from 1 to 100 nm and the density of the projection is preferably from 10 to $10^8$ (N/mm$^2$).

Then, description will be made to a method of producing magnetic recording medium according to the present invention.

In the method according to the present invention, pulsed laser beam is used suitably as an energy beam for forming projections. As another energy beam, electron beam, X ray, ion beam, etc. can be utilized. In a case of utilizing the electron rays, the projections are formed under a vacuum condition.

Figure 5:
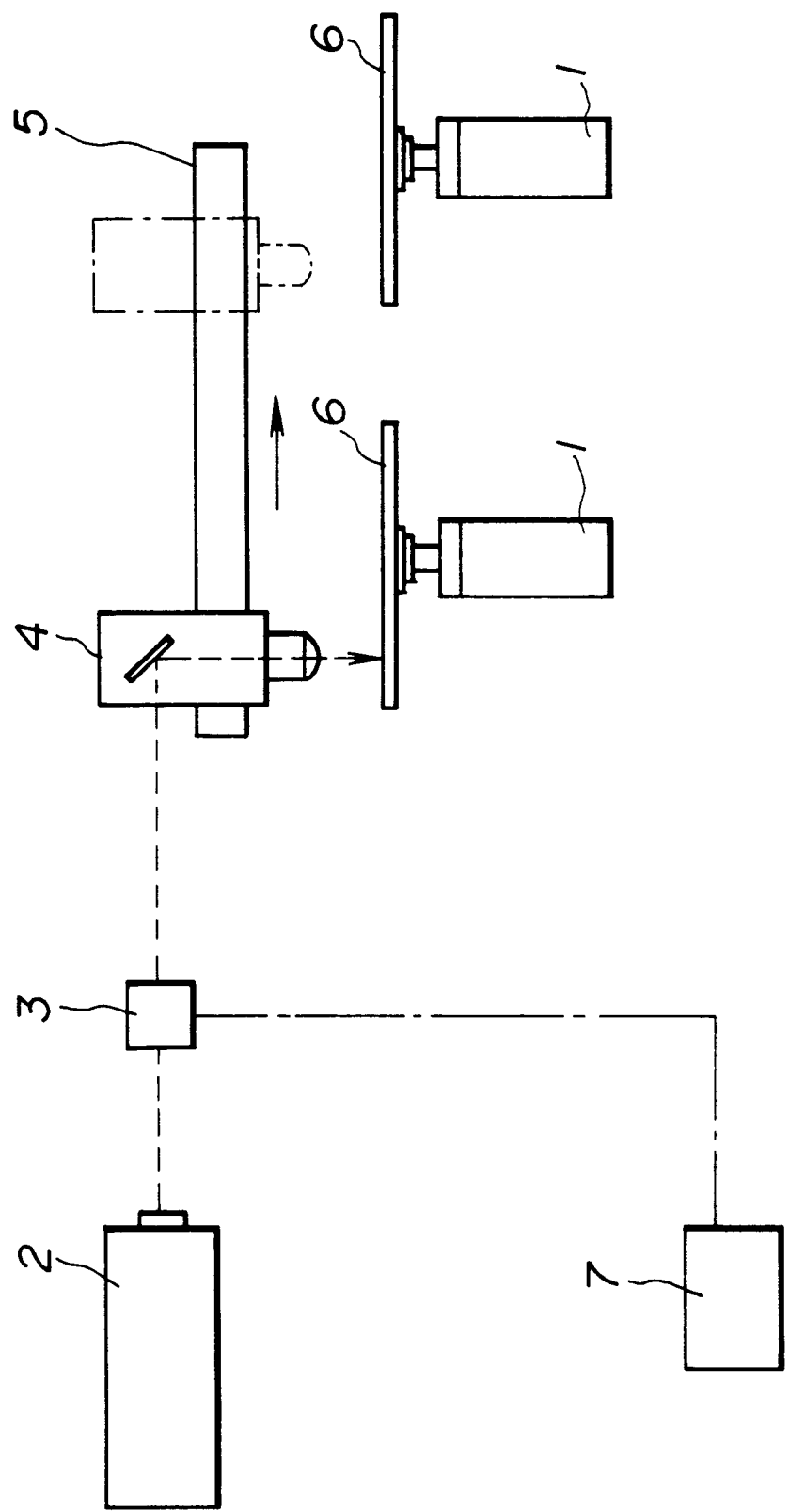
FIG. 5 is an explanatory view for one embodiment of a projection-forming device used in the present invention, which is a device using laser beam as an energy beam.

The projection can be formed by using a projection-forming device shown in FIG. 5. The illustrated projection-forming device which is a device for forming projections on the surface of the disc non-magnetic substrate, comprise a plurality of substrate rotating mechanisms 1, 1, . . . , a laser beam generator 2, a modulator 3 for ON/OFF control of the laser beam from the generator, a light condensing mechanism 4 or irradiating the laser beam from the modulator to the projection-forming surface on a substrate (surface of a non-magnetic substrate, an under layer, a magnetic layer or a magnetic recording medium) rotationally supported by the substrate rotating mechanism, and a moving mechanism 5 for moving the light condensing mechanism onto a plurality of the substrate rotating mechanisms 1, 1, . . . . Although two substrate rotating mechanisms 1 are illustrated, they may be disposed by any number.

The substrate rotating mechanism 1 usually comprises a spindle motor and a substrate 6 is supported on a rotational axis of the spindle motor and moved at a predetermined number of rotation or a linear velocity.

As the laser beam generator 2, a gas laser beam generator such as a $CO_2$ gas laser beam or an Ar gas laser beam is preferably used, and for example, an Ar gas laser beam tube is used suitably. The Ar gas laser beam typically has a wave length at 488 nm or 514.5 nm. Since the gas laser beam has higher coherency and easily be focused in a smaller spot size as compared with an YAG laser beam or excimer laser beam, it is advantageous in that a controlled shape of projections can be formed.

The laser beam irradiated from the laser beam generator 2 to the projection-forming surface is controlled to such an energy as capable of forming a projection of a desired shape. Specifically, the energy (output) is usually defined as within a range from 50 to 700 mW although different depending on the material of the surface of the substrate and the irradiation period of time to the surface of the substrate.

As the modulator 3, an electro-optical modulation device (EOM) is, for example, used suitably in a case of using the Ar gas laser beam tube for the laser beam generator 2. The electro-optical modulation device can conduct high speed modulation (ON-OFF) up to several hundreds kHz). It can also conduct analog modulation during ON state.

The light condensing mechanism 4 comprises a combination of a total reflection mirror and an objective lense and it is used usually in combination with an autofocus (AF) system. For the moving mechanism 5, a linear slider is, for example, used suitably. The light condensing mechanism 4 is mounted on the moving mechanism 5 and reciprocated at a constant speed relative to a plurality of the substrate rotating mechanisms 1, 1 . . . .

The moving mechanism 5 is moved at an increased speed upon moving from one substrate 6 to another substrate 6 considering the productivity. For such a speed control, one moving mechanism 5 is mounted on the other moving mechanism 5 to conduct movement between the substrates by one of them while conduct movement for forming the projection by the other of them.

The projection-forming device has a timing control section 7 for controlling the modulation timing of the laser beam as a means for forming projections at a predetermined pattern of identical or different pitches. That is, in a case of forming projections, for example, at an identical pitch, employed usually, when the substrate 6 is moved at a predetermined number of rotation and a predetermined velocity by the constant speed operation of the moving mechanism 5 and the substrate rotational mechanism 1, the pitch of the projections formed on the surface of the substrate is made greater toward the outer circumference. Then, the position of the substrate is confirmed by the timing control section 7, and the modulation timing of the laser beam (irradiation time) is controlled by the signal to make the interval of the projections formed on the surface of the substrate constant.

The timing control section 7 comprises, for example, a computer, a position detection mechanism and necessary interfaces. As the position detection mechanism, a laser beam displacement meter, encoder or the like can be utilized for instance. Instead of controlling the modulation timing for the laser beam, the speed of the moving mechanism 5 and the substrate rotating mechanism 1 may be controlled.

The projection-forming device described above is operated as below. At first, each of the substrates 6, 6, . . . are set, respectively, to a plurality of the substrate rotating mechanisms 1, 1, . . . and the substrate 6 is rotated at a constant speed. Then, the laser beam from the laser beam generator 2 is converted by the modulator 3 into a pulse laser beam which is illustrated through the light condensing mechanism 4 moving at a constant speed by the moving mechanism 5 to the projection-forming surface on each of the substrates 6, 6. That is, the light condensing mechanism 4 is moved continuously to form projections on the projection-forming surface of a plurality of substrates continuously. Then, while the projections are usually formed concentrically or spirally on the projection-forming surface, they may be formed at random.

A method of producing a magnetic recording medium having at least a magnetic layer, optionally by means of an under layer, on a disc-like non-magnetic substrate in the fourth aspect of the present invention comprises irradiating to the surface of the non-magnetic substrate, the magnetic layer, the under layer or the magnetic recording medium, an energy beam that moves relatively to the surface thereof, melting locally the surface thereof under such a condition that the melting width in a direction orthogonal to the relative moving direction of the energy beam on the surface thereof is not less than 5 $\mu$m, forming projections (protuberant portions) on the surface, and then forming required films of the under layer, the magnetic layer or the protective layer.

In the method in the fourth aspect of the present invention, a depression is formed by the irradiation of an energy beam in formed by the irradiation of the energy beam in a scanning direction of the energy beam in close vicinity to, preferably in contiguous with the projection. In other words, a vertical cross sectional shape passing through the center of the projection and in parallel with the scanning direction of the energy beam is in a shape having a depression on one side of a projection.

The meaning of 'in close vicinity to' is that the depression is present away from the projection (i.e., a flat portion is present between the projection and depression), wherein the distance between the center of the projection and the center of the depression is within 5 $\mu$m. The configuration of the projection with depression formed by the irradiation of the energy beam in the present invention is anisotropic. Further, cross-sectional view of plane in parallel with the laser beam scanning direction is asymmetrical, respectively and cross-sectional view of plane passing through the center of the projection and in orthogonal to the laser beam scanning direction is substantially symmetrical. Also, the highest portion of the projection is present neighboring the center of the scanning line of the energy beam.

The mechanism or progress in which the special projection as described above is formed has not yet been apparent at present but it may be assumed as below.

Figure 6:
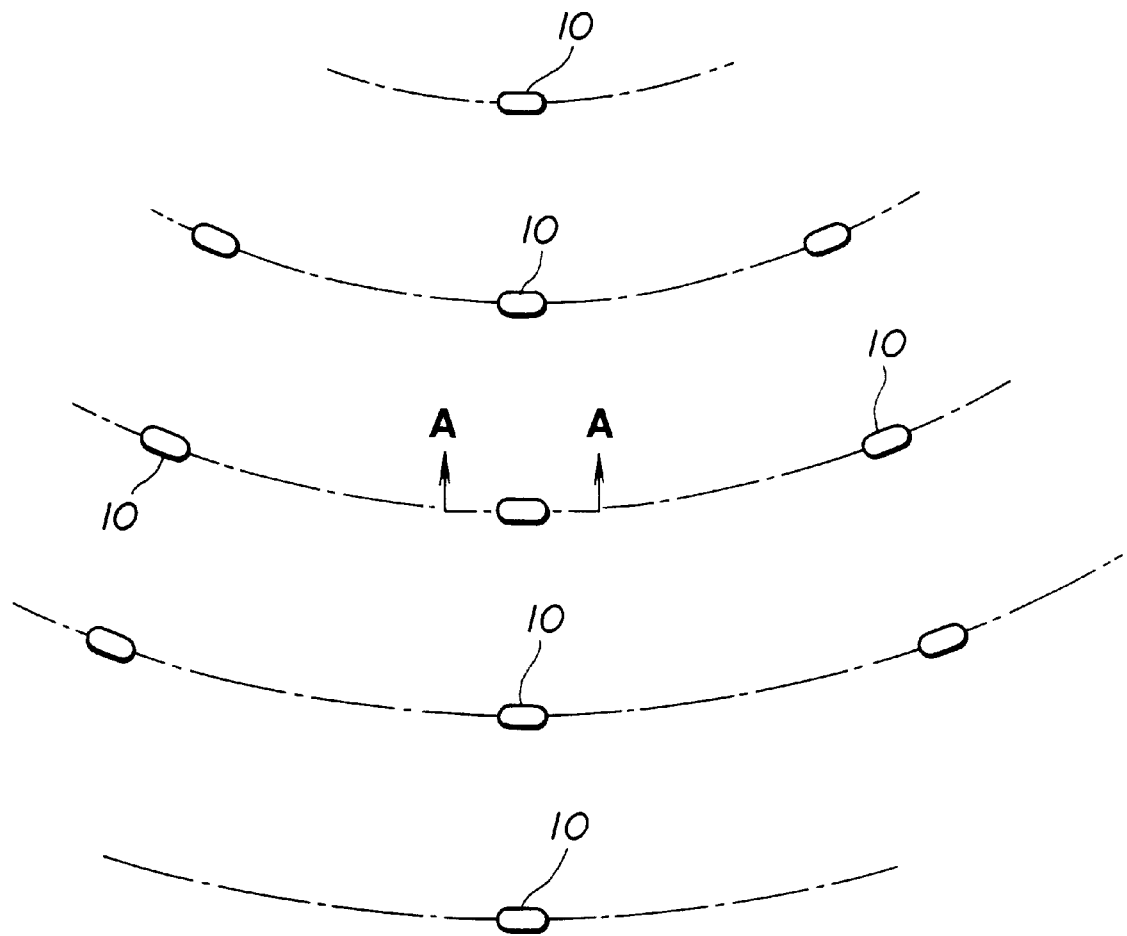
FIG. 6 is a plan view illustrating an example for a spot position of the energy beam on the projection-forming surface.
Figure 7A:
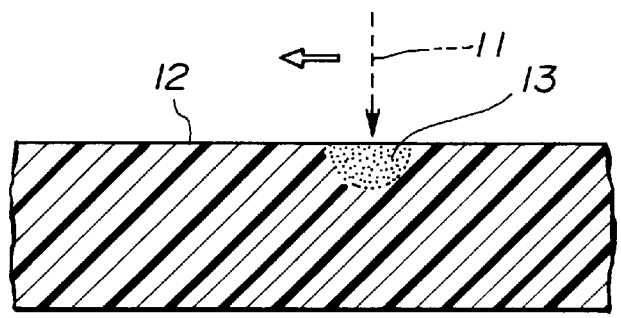
FIG. 7(a), FIG. 7(b) and FIG. 7(c) are is a conceptional views of a cross section of along lines A—A of FIG. 6, illustrating an assumed formation mechanism of the projection.
Figure 7B:
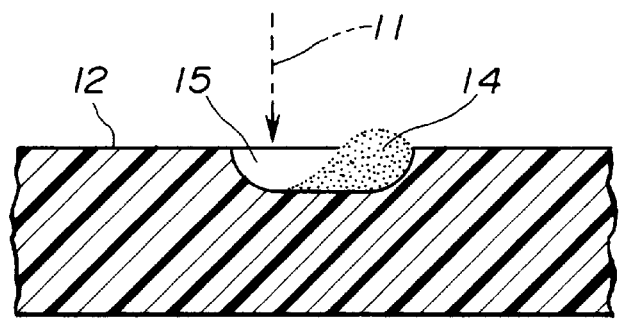
Figure 7C:
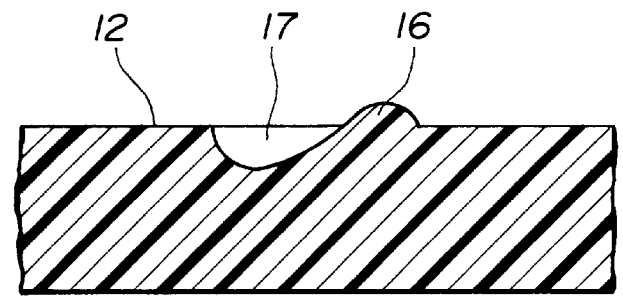

The projections are formed, as shown in FIG. 6, for example, by irradiating energy spots 10 concentrically. Dotted lines in FIG. 6 represent imaginary line for concentric circles. Then, in FIG. 7(a), a projection-forming surface 12 irradiated with a pulse laser beam 11 is overheated locally and a spot portion 13 of the laser beam is melted partially. Then, the molten portion is moved by the scanning of the pulse laser beam 11 in the direction of an arrow. In FIG. 7(b), a temperature gradient is caused to an initially melted portion due to subsequent lowering of the temperature. Then, in accordance with a common rule for a molten liquid, since the surface tension is greater on the side at a lower temperature, portion 14 melted initially and then cooled to a lower temperature raises by intaking a molten liquid from a portion 15 melted subsequently and heated to a higher temperature due to the difference of the surface tension caused by the temperature gradient. As a result, a depression 17 is formed by the initially molten portion, while a depression 17 is formed by a subsequently molten portion as shown in FIG. 7(c). That is, a vertical cross sectional shape passing through the center of the projection 16 and in parallel with the scanning direction of the energy beam is in a shape having a depression 17 on one side of the projection.

Figure 8:
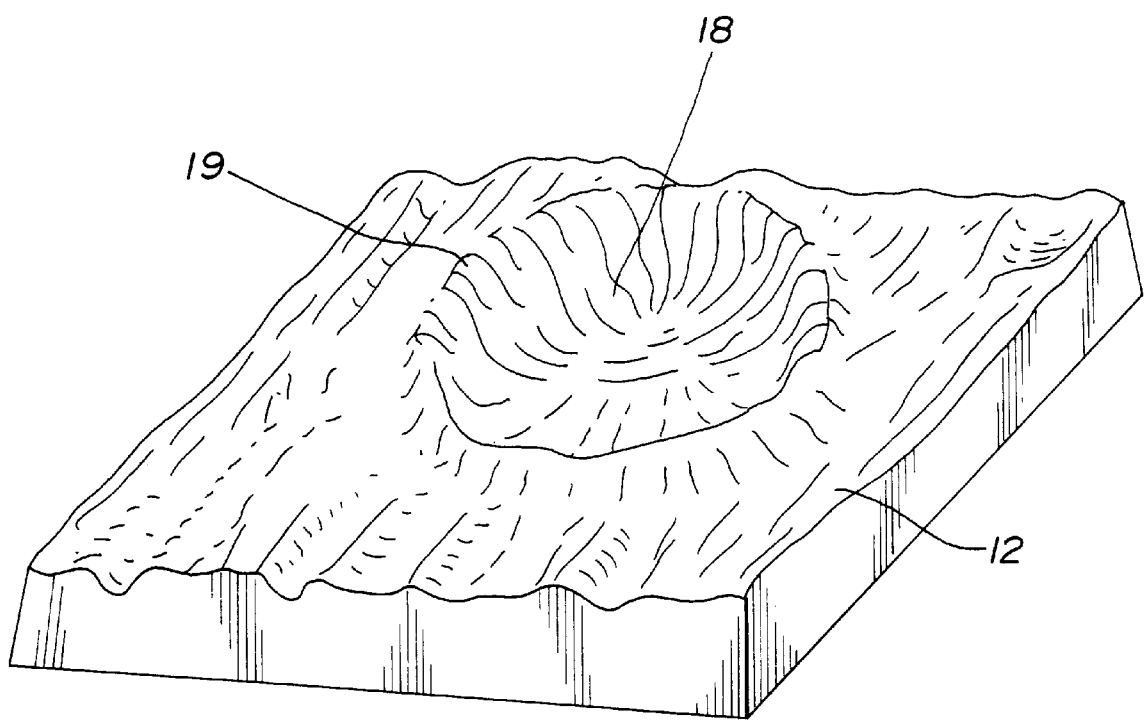
FIG. 8 is an explanatory view for a projection formed by an old laser beam texture.

On the other hand, in the method as disclosed in U.S. Pat. No. 5,062,021 and U.S. Pat. No. 5,108,781, since the irradiation range of the laser beam is wide and the laser beam output to NiP layer on the Al substrate is as large as 1.5 W, a projection in the form of a crater is formed. Then, the forming mechanism is assumed as below. That is, as shown in FIG. 8, since the melting range of the projection-forming surface 12 is wide, a central portion of the molten portion is not protuberant. As a result, it constitutes a crater-like projection comprising a center depression 18 formed by melting and a circular rim 19 raised by the surface tension and solidified at the periphery thereof.

On the contrary, in the present invention, since projection (protuberant portion) is controlled at a high accuracy under the condition of restricting the laser beam into a narrow range and at a low output, the molten range on the projection-forming surface is narrow, the central portion of the molten portion is protuberant and forms a projection (protuberant portion) after solidification. In this regard, the method of forming the projection according to the present invention is greatly different from the method of the above-mentioned U.S. Patents. Then, by the method of forming the projection according to the present invention, a projection having an extremely small area at the top end and preferred for abrupt projection is formed.

In a method in the fourth aspect of the present invention, the melting width of the energy beam on the projection-forming surface in a direction vertical to the moving direction is not more than 5 $\mu$m, preferably not more than 2.5 $\mu$m, more preferably not more than 2 $\mu$m. The preferable lower limit of the melting width of the energy beam is 0.1 $\mu$m. Under the condition that the melting width is more than 5 $\mu$m, the central portion of the molten portion is not formed as a projection but is formed rather as a depression in which the periphery for the portion of the molten liquid is protuberant to form a rim. The reason is considered as below. That is, if the molten range is wide, temperature gradient is caused in the molten liquid during cooling. Then, as described above, since the surface tension of the molten liquid is large in a portion at a low temperature, the surface tension is increased at an outer circumference cooled from the periphery. As a result, it is considered that the periphery of the molten liquid is protuberant if the molten range is wide. The thus formed annular ring has an excessively large area and shows no satisfactory CSS characteristic.

After forming the projections, for example, on the surface of the substrate by the irradiation of the laser beam, required film of under layer, magnetic layer or protective layer is provided by subsequent steps, and the layer is formed in accordance with the method as explained for the first magnetic recording medium according to the present invention.

The method in the fourth aspect of the present invention includes several different embodiments as described below.

In a first embodiment, it is preferred to form projections by irradiating a laser beam on the surface of a substrate, an under layer or a magnetic layer. In this instance, it is preferred to use a pulse laser beam at a laser beam power of not higher than 500 mW, for an irradiation period for once of not more than 5 $\mu$sec and with a spot diameter at the irradiation surface of not more than 5 $\mu$m, and at a relative moving speed of not less than 1 m/sec. Further, in view of cooling after heating by the laser beam irradiation, the heat conductivity of the substrate or the under layer is preferably not more than 250 Watt/mK.

In the present invention, the scanning direction of the laser beam represents not only the scanning direction of the laser beam on a stationary substrate but also the rotating direction of the substrate in which the laser beam is made stationary and irradiated in a state of rotating the substrate.

The height of the projection formed can be optionally controlled by adjusting the intensity of the laser beam, the average irradiation time and the linear velocity of the substrate, and the density of the projection can be optionally controlled by adjusting the number of projections per one circumference, the irradiation interval of the laser beam in the radial direction of the substrate and the condition for controlling the height of the projection. It is preferred that the laser beam intensity is from 20 to 500 mW, the average irradiation time is from 0.05 to 100 $\mu$sec, the laser beam spot diameter is from 0.2 to 4 $\mu$m and the linear velocity of the substrate is from 0.8 to 15 m/sec. The average irradiation time of the laser beam shows a period of time of irradiating the laser beam on the projection-forming surface for forming one projection.

The irradiation area of the laser beam is usually changed usually by changing the number of aperture (open degree) of an objective lense. The irradiation diameter of the laser beam can be controlled about to 0.7–6 $\mu$m by using an objective length having an aperture ratio from 0.1 to 0.95.

In a second embodiment, it is preferred that the laser beam is a pulsed beam, and the projections are formed under the conditions that a scanning parameter (P) defined as: P=$\delta$V/D is not less than 0.25, wherein $\delta$ represents a pulse width, D represents a diameter of a laser beam spot and V represents a relative velocity between the laser beam spot and the substrate surface.

In a third embodiment, it is preferred that an energy beam is irradiated on the surface of a substrate or an under layer to form projections on the surface of the substrate or the under layer, then mechanical texture is applied to the surface of the substrate or the under layer and then required films of the under layer, the magnetic recording layer or the protective layer are formed.

In the third embodiment, the projections are formed by irradiation of the energy beam in the same manner as in the first embodiment of the fourth aspect. In a case of using a pulse laser beam as the energy beam, the scanning distance of the pulsed laser beam on the irradiated surface in the irradiation period for once is preferably not less than ½ of the spot diameter of the pulsed laser beam. In this instance, it is preferred to use a pulsed laser beam at a laser beam power of not higher than 500 mW for an irradiation period per once of not more than 5 $\mu$sec and a spot diameter of the light condensing beam on the irradiated surface of not more than 4 $\mu$m and irradiate the laser beam at a relative moving speed of not less than 1 m/sec. Further, the heat conductivity of the substrate or the under layer is preferably not more than 100 Watt/mK.

In the third embodiment, mechanical texture is applied with a grinding amount usually of not more than 0.1 mg/cm$^2$, preferably not more than 0.05 mg/cm$^2$, more preferably not more than 0.02 mg/cm$^2$. The preferable lower limit of the grinding amount is 0.001 mg/cm$^2$. The purpose of the mechanical texture is to remove polishing traces present on the substrate and roughen the top of the projections having an appropriate radius of curvature formed by the laser beam irradiation.

In the second embodiment, projections are formed on the surface of the substrate or the under layer as described above, a mechanical structure is further applied and then required films of the under layer, magnetic recording layer or the protective layer are formed.

Then, in a case of a projection elongate in the scanning direction formed by making the scanning time of the laser beam longer and conducting the scanning continuously, the density of the projections is preferably from 5 to $10^4$ (N/mm) at a pitch in a direction orthogonal to the scanning direction (i. e., radial direction of the magnetic recording disc), and the height of the projections is preferably from 3 to 100 nm along a pitch in parallel with the scanning direction (circumferential direction of the magnetic recording disc) In addition, a projection having an aspect ratio for the cross section of the bottom of not less than 2, preferably has not more than 1 $\mu$m of a cross sectional length in a direction orthogonal to the scanning direction of the laser beam at a position 1 nm below the top. In any of the embodiments described above, the energy beam can be scanned also spirally.

In a method in the fifth aspect of the present invention, it is preferred that the magnetic recording medium has a lubricant layer on the surface of the protective layer and an energy beam is irradiated by way of the protective layer or the lubricant layer to locally heating the magnetic layer, under layer or the substrate, thereby melting or softening the surface of the magnetic layer, under layer or the substrate, and forming projections on the magnetic layer, the under layer or the substrate. In this case, an irradiated portion of the magnetic recording medium is preferably put under an inert gas atmosphere upon laser beam irradiation. That is, since the protective layer does not directly generate heat by the laser beam, but the temperature is increased by heat conduction from the heat-generated magnetic layer or the like, it is preferably put under the inert gas atmosphere such as of nitrogen or argon gas in order to completely prevent injury to the protective layer.

The mechanism for forming projection in the second aspect of the present invention of irradiating the energy beam by way of the protective layer or lubricant layer has not yet been apparent at present but it may be assumed as below.

When the laser beam is irradiated on the surface of the magnetic recording medium, since most of light transmits the lubricant layer and the protective layer, the magnetic layer is heated directly and the under layer is also heated locally by heat conduction. Usually, since the under layer has a melting point lower than that of the magnetic layer, the locally heated portion expands thermally and depending on the condition, it is melted or softened partially to increase the volume. Accordingly, the magnetic layer at the surface is raised upward. In this instance, since the magnetic layer itself is also heated, it deforms plastically relative to the raising force from the lower layer to form projections after cooling. It is considered that in a case where the laser beam output is small, the lower layer of the magnetic layer or the substrate expands thermally and causes plastic deformation upon shrinkage during cooling, and the magnetic layer and the protective layer are raised locally to form projections. In this case, the compressive stress of the thin films affects complicatedly the surface configuration at the laser beam processing. On the other hand, in a case where the laser beam output is large, the lower layer of the magnetic layer or the substrate are melted or softened locally and projections having a characteristic shape are formed due to the difference of the surface tension at the molten liquid portion. That is, as described above, since the surface tension of the molten liquid is large at a low temperature side, it raises spherically on the low temperature side, and a portion on the high temperature side which solidifies finally, that is, in a portion finally scanned with the laser beam a depression is formed and it is quenched to solidify. Then, also the magnetic layer and the protective layer deform in the same manner conforming the shape of the under layer or the substrate.

For forming the characteristic feature as described above, by using a pulse laser beam as an energy beam, it is preferred that the light transmissivity of the protective layer or the lubricant layer relative to the laser beam to be irradiated is preferably not less than 50%. Further, the laser beam is scanned preferably in the distance of not less than ¼ of the spot diameter of the laser beam. Such embodiment can be attained by adopting conditions that the scanning parameter defined as $P=\delta V/D$ is not less than 0.25, assuming the pulse width (all the irradiation time) as $\delta$, the diameter of the laser beam spot as D, and the relative velocity between the laser beam spot and the surface of the substrate as V.

If the scanning time of the laser beam is made longer or scanning is applied continuously, the projection formed is made longer along the scanning direction to form a projection like that a shape of mountain chain in which the aspect ratio at the cross section of the bottom of the projection is not less than 2. Generally, the projections described above provide more excellent CSS characteristic, but projections in the form of the mountain chain provide more excellent durability in a case of an approximate contacting recording in which the magnetic head moves slidingly at a high speed to the magnetic recording medium continuously. Further, when the laser beam is continuously scanned spirally, a continuous projection in the form of the mountain chain is formed.

In a case of forming the spiral projection in the form of the mountain chain, the laser beam is caused to oscillate continuously while scanning the energy beam in a radial direction.

In the method in the fifth aspect of the present invention, a laser beam is irradiated on a magnetic layer by way of a protective layer or a lubricant layer by utilizing that the laser beam is less absorbed in the protective layer and the lubricant layer, in which the laser beam power has to be controlled within an appropriate range in view of preventing damages to the protective layer or the lubricant layer.

In a method of forming projections by irradiation of a laser beam before forming a film of the magnetic layer on the surface of the under layer, since the projections are formed while interrupting the film-forming process of the production of the magnetic recording medium, the step is made complicate. In the method in the fifth aspect described above, however, since the projections are formed after the film-forming step is completed entirely, it is extremely advantageous in view of the manufacturing process.

In case of irradiating the laser beam to the protective layer which is formed by sputtering film-formation, the configuration of the projections depends greatly upon intrinsic compressive stress of the protective layer and magnetic layer. When the compressive stress is large, various kinds of projections with no depression is formed.

In any one of the method according to the present invention, the projections are formed to a region in which the magnetic head conducts the CSS operation. The projections are preferably formed in such a way as the height of the projections is reduced toward the data recording region. For this purpose, it is required to irradiate the laser beam while decreasing the laser beam power toward the data recording region. Further, it is preferred to provide projections each having a height of 1 to 100 nm, preferably 1 to 60 nm, at the number of 10 to $10^8$ per 1 $mm^2$. Further, the average contour line area (1) described above is, preferably not more than 2 $\mu m^2$, and the cross sectional length of the projection in a direction orthogonal to the scanning direction of the energy beam is preferably not more than 1 $\mu m$ at a position 1 nm below the top.

Descriptions will then be made to a recording/reading-out method according to the present invention.

In the recording/reading-out method according to the present invention, reading out/writing into data of the magnetic recording medium (disc) by the magnetic head is conducted by the CSS system. In the recording/reading-out method according to the present invention, a disc used has projections in a CSS region where a magnetic head conducts a CSS operation and the height of the projections is decreased toward the data recording medium, in which the magnetic head lowers to disc and rises from the disc in a CSS region in which projections having a height lower than the average projection height are present or in neighborhood of the region in which the projections are present, and the magnetic head stays stationary in a CSS region in which projections of a height higher than the average height of the projections are present. The magnetic head may be moved to a portion in which the height of the projections is higher at slower rotational speed of the disk or even immediately after stopping of the disc so long as it is before sticking of the magnetic head.

A magnetic recording device for conducting the recording/reading-out method according to the present invention has the following operational function. That is, when the magnetic recording device stays stationary, the magnetic head is placed at a portion of the CSS region where the height of the projections is high with less stitching. When a driving device is started, the magnetic head moves to a portion of the CSS region where the height of the projections is lower accompanying the rotation of the disc. This portion causes stitching if the magnetic head stops on the magnetic disc, but frictional force in the state of sliding movement is designed small enough. When the number of rotation of the magnetic disc reaches a predetermined high speed rotation, the magnetic head completely leaves the magnetic disc and can freely move on the data recording region.

During driving of the magnetic recording device, if the magnetic head does not conduct seeking on the data recording region, the magnetic head preferably stands-by in a region of the CSS region where the height of the projections is lower for emergency of power source abnormality or the like. Accordingly, the CSS region of lower projection height preferably has a glide height substantially equal with that of the data recording region.

When the magnetic recording device under driving is to be stopped, the magnetic head at first moves from the data recording region to a region of the CSS region in which the height of the projections is low. Then, the number of rotation of the disc is reduced to lower the flying height of the magnetic head and the magnetic head is moved to the CSS region of the high projection height and stopped when the bottom of the magnetic head is brought into the state of abutment against the projections, the magnetic head is moved to the CSS region of the high projection height and stopped.

Further, in a case where mechanical texture with small surface roughness causing no problem in view of the frictional force but causing stitching upon stationary state of the magnetic head is applied over the entire surface of the disc, the magnetic head may be landed to the surface of the mechanical texture neighboring the CSS region.

The recording/reading-out method according to the present invention is based on the premise of using a disc having projections in a CSS region, in which the height of the projection is decreased toward the data recording region, and magnetic recording media of any of the embodiment described above can be used so long as such conditions are satisfied. Then, according to the recording/reading-out method of the present invention, the stable raising height of the magnetic head in the data recording region can be made low enough to such an extent as defined by the glide of the data recording region.

Further, since the magnetic head can be stopped on the projections at such a moderate height so as not to cause stitching in the CSS region, it is possible to develop a high density magnetic recording device not causing sticking.

EXAMPLES

The present invention will be explained more specifically by way of examples but the invention is not restricted only to the following examples unless it does not exceed beyond the scope of the gist of the invention.

In the following examples and comparative examples, a magnetic recording medium in which an under layer, a magnetic layer, an intermediate layer, a protective layer and a lubricant layer are formed successively on a non-magnetic substrate was manufactured. Unless otherwise specified, they were constituted as: the under layer composed of NiP, the intermediate layer composed of Cr, the magnetic layer composed of Co—Cr—Ta alloy, the protective layer composed of carbon, the lubricant layer composed of fluorocarbon-based liquid lubricant "DOL-2,000" (produced by Monte Edison Co.), in which the intermediate layer (100 $\mu m$ in thickness), the magnetic layer (50 nm in thickness) and the protective layer (20 nm in thickness) were formed by sputtering method, and the lubricant layer (2 nm in thickness) was formed by dipping method. Further, as the energy beam for forming the projection, an argon pulse laser beam (wavelength $\lambda$: 514.5 nm) controlled at a high accuracy was used.

Examples 1–3 and Comparative Examples 1–4

After applying an NiP plating treatment to a thickness of 10 to 20 $\mu m$ on an Al alloy substrate of 95 mm diameter, a surface polishing treatment was applied so as to impart a surface roughness (Ra) of not more than 1 nm, thereby obtaining an NiP under layer on the substrate.

Then, after irradiating a laser beam and forming projections on the NiP layer, an intermediate layer, a magnetic layer, a protective film and a lubricant layer were formed successively to produce a magnetic recording medium.

Further, as a Comparative Example 2, a magnetic recording medium was produced in the same manner as Example 1 except for forming projections each in a shape of a crater by changing a substrate linear speed to 429 mm/s and a laser beam intensity to 1.5 W. Then, as Comparative Example 3, a magnetic recording medium was produced in the same manner as in Example 1 except for applying texture at a roughness Ra of about 7 nm by a mechanical texture method, instead of laser beam irradiation, on the surface of the NiP under layer. Further, as Comparative Example 4, a magnetic recording medium was produced in the same manner as in Example 1 except for not applying laser beam irradiation.

Table 1 shows irradiation conditions for the laser beam and for the characteristic of resultant projections. The average density of the projections in the table corresponds to the interval of the laser beam irradiation.

Table 1 shows a static friction coefficient before CSS test for each of magnetic recording media (initial sticksion) and frictional force after 20,000 cycles of CSS. The magnetic recording medium of Comparative Example 4 caused head crush by adsorption and both of the static friction coefficient and the frictional force could not be measured. The CSS test was conducted under normal temperature and normal humidity circumstance, using a thin film head at 6 gf of load gram (slider material: $Al_2O_3TiC$) and under a condition of a head flying height of $2\mu$ inch. Further, the stable flying height of the head was evaluated by using a glide tester for the rising stability of the head upon seeking between a data recording region and a CSS region. The stable flying height in the CSS region was $1.5\mu$ inch in each of the magnetic recording media of Examples 1 to 3 and Comparative Examples 2 to 3 and that of Comparative Example 1 was more than $4\mu$ inch.

TABLE 1

|  | Example 1 | Example 2 | Example 3 |
|---|---|---|---|
| Substrate linear speed (mm/s) | 857 | 857 | 857 |
| Laser intensity (mw) | 300 | 250 | 300 |
| Average irradiation time ($\mu$sec) | 2.5 | 2.5 | 2.5 |
| Average projection density (N/mm$^2$) | 9260 | 9260 | 4120 |
| Average projection height (nm) | 37 | 30 | 37 |
| Static friction coefficient | 0.18 | 0.17 | 0.18 |
| Frictional force (gf) after 20,000 cycles of CSS | 5 | 8 | 6 |

|  | Comp. Example 1 | Comp. Example 2 | Comp. Example 3 |
|---|---|---|---|
| Substrate linear speed (mm/s) | 429 | 429 | — |
| Laser intensity (mw) | 800 | 1.5w | — |
| Average irradiation time ($\mu$sec) | 5.0 | 2.5 | — |
| Average projection density (N/mm$^2$) | 9260 | 90 | — |
| Average projection height (nm) | 120 | 30 | — |
| Static friction coefficient | 0.16 | 0.45 | 0.32 |
| Frictional force (gf) after 20,000 cycles of CSS | (Note 1) | 32 | 22 |

(Note 1): Head crush (CSS: 1000 cycles)

Examples 4–8, Comparative Examples 5–6

After irradiating a laser beam on a mirror wafer-like Si substrate having 63.5 mm in diameter and not more than 0.3 nm of surface roughness (Ra) and forming projections each of a substantially equal height, an NiP under layer (100 nm in thickness) was formed by sputtering method and, further, an intermediate layer, a magnetic layer and a lubricant layer were successively formed to produce a magnetic recording media.

Table 3 shows the irradiating conditions of the laser beam and the characteristic of the resultant projections. Further, it shows the result of evaluation for the magnetic recording media conducted in the same manner as in Example 1. The CSS test was conducted under the condition of the head flying height of $1.6\mu$ inch. The stable flying height of the CSS region was not more than $0.8\mu$ inch in the magnetic recording medium in Example 6 and $0.8\mu$ inch in all other magnetic recording media than described above. The spot diameter to which 84% of the energy of the laser beam is concentrated, can be calculated by utilizing a number of aperture (NA) of an objective lens and calculated by $1.22\times \lambda/NA$.

The contour line area (1) ($\mu m^2$) in Table 2 represents an average area of a figure surrounded with contour lines at a height 1 nm below the top of the projection.

TABLE 2

|  | Example 4 | Example 5 | Example 6 |
|---|---|---|---|
| Substrate linear speed (mm/s) | 343 | 343 | 343 |
| Laser intensity (mw) | 1750 | 1820 | 1220 |
| Average irradiation time ($\mu$sec) | 1.25 | 1.25 | 1.25 |
| Average projection density (N/mm$^2$) | 9260 | 9260 | 37040 |
| Average projection height (nm) | 14 | 13 | 6 |
| Contour line area (1) ($\mu m^2$) | 0.08 | 0.16 | 0.12 |
| Number of aperture of objective lens (NA) | 0.6 | 0.4 | 0.95 |
| Static friction coefficient | 0.14 | 0.17 | 0.23 |
| Frictional force (gf) after 20,000 cycles of CSS | 3 | 7 | 6 |

|  | Ex. 7 | Ex. 8 | Comp. Ex. 5 | Comp. Ex. 6 |
|---|---|---|---|---|
| Substrate linear speed (mm/s) | 343 | 343 | 343 | 343 |
| Laser intensity (mw) | 1990 | 1750 | 940 | 945 |
| Average irradiation time ($\mu$sec) | 1.25 | 1.25 | 1.25 | 1.25 |
| Average projection density (N/mm$^2$) | 4120 | 740 | 9260 | 93 |
| Average projection height (nm) | 16 | 14 | <1 | 3 |
| Contour line area (1) ($\mu m^2$) | 0.18 | 0.08 | — | 0.12 |
| Number of aperture of objective lens (NA) | 0.3 | 0.6 | 0.95 | 0.95 |
| Static friction coefficient | 0.43 | 0.64 | 6.22 | 1.35 |
| Frictional force (gf) after 20,000 cycles of CSS | 12 | 14 | (Note 1) | 33 |

(Note 1): Driving stopped by adsorption (CSS: 800 cycles)

Examples 9–12

A film of an NiP under layer of 100 to 150 nm in thickness was formed by sputtering method on a glass substrate of 95 mm in diameter in which the surface was polished so as to form a surface roughness (Ra) of not more than 1 nm.

Then, after irradiating the laser beam on the NiP layer and forming projections each of substantially the same height, an intermediate layer, a magnetic layer, a protective layer and a lubricant layer were formed successively to produce a magnetic recording media.

Table 3 shows irradiation conditions of the laser beam and the characteristics of the resultant projections. Further, Table 3 also shows the results for the evaluation of the magnetic recording media conducted in the same manner as in Example 1. The CSS test was conducted under the condition of a head flying height of $1.6\mu$ inch. The stable flying height in the CSS region was from 1.0 to 1.1μ inch for all the magnetic recording media in the examples.

A figure (horizontal cross sectional shape) surrounded with a contour line at a half height of the projection obtained in Example 9 is usually a circular shape as shown in FIGS. 1 to 3.

TABLE 3

|  | Ex. 9 | Ex. 10 | Ex. 11 | Ex. 12 |
|---|---|---|---|---|
| Substrate linear speed (mm/s) | 1714 | 1714 | 1714 | 1714 |
| Laser intensity (mw) | 50 | 62 | 27 | 68 |
| Average irradiation time (μsec) | 1.25 | 1.25 | 1.25 | 1.25 |
| Average projection density (N/mm$^2$) | 9260 | 9260 | 37040 | 4120 |
| Average projection height (nm) | 18 | 16 | 4 | 18 |
| Contour line area (1) (μm$^2$) | 0.09 | 0.15 | 0.14 | 0.19 |
| Number of aperture of objective lens (NA) | 0.6 | 0.4 | 0.95 | 0.3 |
| Static friction coefficient | 0.15 | 0.17 | 0.21 | 0.49 |
| Frictional force (gf) after 20,000 cycles of CSS | 3 | 8 | 7 | 13 |

Examples 13 and 14

After applying NiP plating treatment to a thickness of 10 to 20 μm on an Al alloy substrate of 95 mm in diameter, mechanical texture treatment or surface polishing treatment was conducted so as to impart a surface roughness Ra of not more than 2 nm and then an intermediate layer and a magnetic layer were formed successively.

Then, after forming projections by irradiation of a laser beam on the surface of the magnetic layer, a protective film and a lubricant layer were successively formed to produce a magnetic recording medium.

Table 4 shows irradiation conditions of the laser beam and the characteristics of the resultant projections. Further Table 4 also shows the result of evaluation for the magnetic recording media conducted in the same manner as in Example 1. The CSS test was conducted under the conditions of a head flying height of 1.6μ inch. The stable flying height in the CSS region was 1.2 to 1.5μ inch for the magnetic recording media in all of the examples.

TABLE 4

|  | Ex. 13 | Ex. 14 |
|---|---|---|
| Substrate linear speed (mm/s) | 1714 | 1714 |
| Laser intensity (mw) | 158 | 110 |
| Average irradiation time (μsec) | 1.25 | 1.25 |
| Average projection density (N/mm$^2$) | 4120 | 9260 |
| Average projection height (nm) | 26 | 18 |
| Contour line area (1) (μm$^2$) | 0.15 | 0.10 |
| Number of aperture of objective lens (NA) | 0.4 | 0.6 |
| Static friction coefficient | 0.23 | 0.19 |
| Frictional force (gf) after 20,000 cycles of CSS | 9 | 8 |

Examples 15–17

After irradiating a laser beam of a mirror wafer-like Si substrate having 63.5 mm in diameter and a surface roughness (Ra) of not more than 1 μm and forming projections each of substantially equal height, an NiP under layer (100 nm in thickness) was formed by sputtering, and further, an intermediate layer, a magnetic layer and a lubricant layer were successively formed to produce a magnetic recording media.

Table 5 shows the irradiating conditions of the laser beam and the characteristics of the resultant projections. Further, Table 5 shows the result of evaluation for the magnetic recording media conducted in the same manner as in Example 1. The average linear density of projection (N/mm) in the table represents the number of projections in each of the circumferential direction/radial direction for a portion of the magnetic recording medium in which projections are present, and a contour line area (2) (μmm$^2$) represents an average area of a figure surrounded with a contour line at a half height of the projection. The stable flying height in the CSS region was 1.2 to 1.4μ inch in the magnetic recording media for all the examples.

TABLE 5

|  | Ex. 15 | Ex. 16 | Ex. 17 |
|---|---|---|---|
| Substrate linear speed (mm/s) | 644 | 644 | 644 |
| Laser intensity (mw) | 500 | 500 | 500 |
| Average irradiation time (μsec) | 3.12 | 3.12 | 3.12 |
| Average projection linear density (N/mm) | 100/100 | 200/50 | 10/10 |
| Average projection density (N/mm$^2$) | 10000 | 10000 | 100 |
| Average projection height (nm) | 31 | 31 | 31 |
| Contour line area (1) (μm$^2$) | 0.05 | 0.05 | 0.05 |
| Contour line area (2) (μm$^2$) | 0.71 | 0.71 | 0.71 |
| Static friction coefficient | 0.14 | 0.17 | 0.45 |
| Frictional force (gf) after 20,000 cycles of CSS | 2 | 4 | 13 |

Examples 18–22

After applying NiP plating to a thickness of 10 to 20 μm on an Al alloy substrate of 95 mm in diameter, a surface polishing treatment was conducted so as to impart a surface roughness Ra of not more than 1 nm, thereby obtaining an Nip under layer on the substrate. Then, after forming projections by irradiating a laser beam on the NiP layer, an intermediate layer, a magnetic layer, a protective layer and a lubricant layer were formed successively to produce a magnetic recording medium.

Table 6 shows irradiation conditions of the laser beam and the characteristics of the resultant projections. Further Table 6 also shows the results of evaluation for the magnetic recording media conducted in the same manner as in Example 1. The CSS test was conducted under the conditions of a head flying height of 2.5μ inch. The stable flying height in the CSS region was 1.2 to 1.6μ inch for magnetic recording media in all of the examples. The horizontal cross sectional shape of the projection in the table represents a shape for a figure surrounded with a contour line at a half height the projection.

Figure 4:
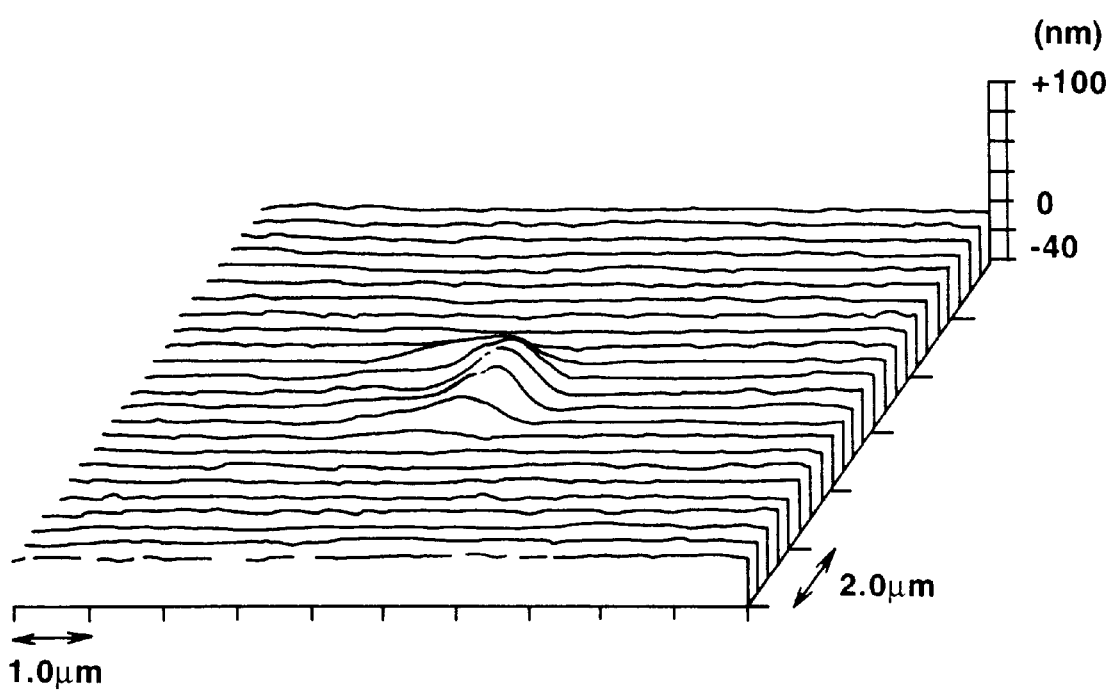
FIG. 4 is a perspective view illustrating the shape of a projection formed on the surface of an NiP layer on a disc substrate and measured by the said surface shape-measuring device utilizing laser beam interference.

A figure (horizontal cross sectional shape) surrounded with a contour line at a half height of the projection obtained in Example 18 is usually a crescent shape as shown in FIG. 4. Since the projection shown in FIG. 4 was formed by the short scanning period of the energy beam, it was different to find out the depression ranging the projection. However, in case where the magnetic layer and protective layer were formed on the NiP under layer in which projections were formed, the depression ranging the projection appears by the thermal history of sputtering.

TABLE 6

|  | Ex. 18 | Ex. 19 | Ex. 20 |
|---|---|---|---|
| Substrate linear speed (mm/s) | 1600 | 1600 | 1600 |
| Laser intensity (mw) | 200 | 200 | 200 |
| Average irradiation time ($\mu$sec) | 0.62 | 0.62 | 0.62 |
| Average projection linear density (N/mm) | 100/100 | 200/50 | 50/50 |
| Average projection density (N/mm$^2$) | 10000 | 10000 | 2500 |
| Average projection height (nm) | 27 | 27 | 27 |
| Contour line area (1) ($\mu$m$^2$) | 0.07 | 0.07 | 0.07 |
| Horizontal cross sectional shape of projection | A | A | A |
| Number of aperture of objective lens (NA) | 0.6 | 0.6 | 0.6 |
| Static friction coefficient | 0.17 | 0.18 | 0.33 |
| Frictional force (gf) after 20,000 cycles of CSS | 3 | 3 | 12 |
|  | Ex. 21 | Ex. 22 |  |
| Substrate linear speed (mm/s) | 1600 | 3200 |  |
| Laser intensity (mw) | 300 | 350 |  |
| Average irradiation time ($\mu$sec) | 0.07 | 0.62 |  |
| Average projection linear density (N/mm) | 150/150 | 30/20 |  |
| Average projection density (N/mm$^2$) | 22500 | 600 |  |
| Average projection height (nm) | 12 | 38 |  |
| Contour line area (1) ($\mu$m$^2$) | 0.08 | 0.09 |  |
| Horizontal cross sectional shape of projection | A | B |  |
| Number of aperture of objective lens (NA) | 0.6 | 0.6 |  |
| Static friction coefficient | 0.23 | 0.16 |  |
| Frictional force (gf) after 20,000 cycles of CSS | 6 | 10 |  |

(note) A: Crescent; B: half moon

Examples 23–26

After applying NiP plating treatment to a thickness of 10 to 20 $\mu$m on an Al alloy substrate of 95 mm in diameter, surface polishing treatment was conducted so as to impart a surface roughness (Ra) of about 1 nm, thereby obtaining an NiP under layer on the substrate.

Then, after forming projections by the irradiation of an argon pulse laser beam (wavelength λ: 488 nm) in a CSS region on the NiP layer, an intermediate layer, a magnetic layer, a protective layer and a lubricant layer were successively formed to produce a magnetic recording medium.

Table 7 shows irradiation conditions of the laser beam and characteristics of the resultant projections. Further Table 7 also shows the result of evaluation for the magnetic recording media conducted in the same manner as in Example 1. However, the CSS test was conducted under the conditions of a head flying height of 2.5$\mu$ inch. The stable flying height in the CSS region was 1.2 to 1.6$\mu$ inch for magnetic recording media in all of the examples.

TABLE 7

|  | Ex. 23 | Ex. 24 |
|---|---|---|
| Substrate linear speed (mm/s) | 3200 | 3200 |
| Laser intensity (mw) | 100 | 100 |
| Average irradiation time ($\mu$sec) | 0.31 | 0.31 |
| Average projection linear density (N/mm) | 100/100 | 200/50 |
| Average projection density (N/mm$^2$) | 10000 | 10000 |
| Average projection height (nm) | 22 | 22 |
| Contour line area (1) ($\mu$m$^2$) | 0.07 | 0.07 |
| Contour line area (2) ($\mu$m$^2$) | 0.93 | 0.93 |
| Horizontal cross sectional shape of projection | C | C |
| Number of aperture of objective lens (NA) | 0.6 | 0.6 |
| Static friction coefficient | 0.17 | 0.18 |
| Frictional force (gf) after 20,000 cycles of CSS | 3 | 3 |
|  | Ex. 25 | Ex. 26 |
| Substrate linear speed (mm/s) | 3200 | 3200 |
| Laser intensity (mw) | 100 | 120 |
| Average irradiation time ($\mu$sec) | 0.31 | 0.31 |
| Average projection linear density (N/mm) | 50/50 | 10/20 |
| Average projection density (N/mm$^2$) | 2500 | 200 |
| Average projection height (nm) | 22 | 26 |
| Contour line area (1) ($\mu$m$^2$) | 0.07 | 0.08 |
| Contour line area (2) ($\mu$m$^2$) | 0.93 | 1.82 |
| Horizontal cross sectional shape of projection | C | C |
| Number of aperture of objective lens (NA) | 0.6 | 0.6 |
| Static friction coefficient | 0.37 | 0.23 |
| Frictional force (gf) after 20,000 cycles of CSS | 12 | 6 |

(Note) C: Circular shape

Examples 27–29

After applying NiP plating treatment to a thickness of 10 to 20 $\mu$m on an Al alloy substrate of 95 mm diameter, mechanical texture or surface polishing treatment was conducted so as to impart a surface roughness Ra of not more than 2 nm.

Then, after irradiating a laser beam on the NiP layer and forming projections, an intermediate layer, a magnetic layer, a protective layer and a lubricant layer were formed successively to produce a magnetic recording medium.

Table 8 shows the irradiation conditions for the laser beam and the characteristics of the resultant projections. Further, Table 8 shows the results of evaluation for the magnetic recording media conducted in the same manner as in Example 1. The CSS test was conducted under the head flying height of 2.2$\mu$ inch. The stable flying height in the CSS region was 1.1 to 1.3$\mu$ inch in the magnetic recording media of all the examples. In the table, major axis/minor axis the presents the aspect ratio (major axis/minor axis) for the cross section at the bottom of the projection, and a cross sectional distance ($\mu$m) represents a width of a minor axis at the cross section surrounded with a contour line at a height 1 nm below the top of the projection.

TABLE 8

|  | Ex. 27 | Ex. 28 | Ex. 29 |
|---|---|---|---|
| Substrate linear speed (mm/s) | 1714 | 1714 | 1714 |
| Laser intensity (mw) | 98 | 62 | 98 |
| Average irradiation time ($\mu$sec) | 9.4 | 27.0 | 9.4 |
| Average projection linear density (N/mm) | 10/10 | 25/25 | 20/10 |
| Average projection density (N/mm$^2$) | 100 | 625 | 200 |
| Average projection height (nm) | 28 | 7 | 28 |
| Major axis/minor axis | 8 | 23 | — |
| Cross sectional distance ($\mu$m) | 0.15 | 0.5 | 0.15 |
| Number of aperture of objective lens (NA) | 0.6 | 0.6 | 0.6 |
| Static friction coefficient | 0.28 | 0.79 | 0.55 |
| Frictional force (gf) after 20,000 cycles of CSS | 11 | 19 | 18 |

Examples 30 and 31

After forming NiP plating treatment to a thickness of 10 to 20 $\mu$m on an Al alloy substrate of 95 mm in diameter, mechanical texture treatment was applied circumferentially to impart the date recording region and a CSS region with a surface roughness (Ra) of not more than 2 nm.

Then, after forming projections by irradiating a laser beam to the CSS region of the NiP layer, a protective film and a lubricant layer were successively formed to produce a magnetic recording medium.

Formation of the projections in Example 30 was conducted as below.

A radial range of 21 to 18 mm from the center of the substrate was defined as a CSS region. Then, in a radial range of 21 to 20 mm to the outer side of the defined region, long projections having a cross section at the bottom with an aspect ratio of 3 were formed by the number of 20 per 1 mm radial length. In this case, the height of the projections was varied about from 5 to 30 nm by changing the laser beam intensity within a range from 60 to 105 mW. Further, within a radial range from 20 to 19 mm from the center of the substrate, short projections having a cross section at the bottom with an aspect ratio of about 1 were formed. In this case, the height of the projections was carried about from 30 to 70 nm by changing the laser beam intensity from 95 to 220 mW. Further, short projections having a cross section at the bottom with an aspect ratio of about 1 were formed at a magnetic head stopping position within a radial range from 19 to 18 mm from the center of the substrate. In this case, the height of the projections was made uniform at about 70 nm and the density of the projections was 160 Numbers/mm$^2$ (=N/mm$^2$).

In Example 31, projection were formed quite in the same manner as in Example 30 except for forming projections at a height of about 70 nm of the projection in 80 N/mm$^2$ at a stopping position of the magnetic head within radial range from 19 to 18 mm from the center of the substrate.

Table 9 shows the irradiation conditions of the laser beam and the characteristic of the resultant projections.

Further, Table 9 shows the result of evaluation for the magnetic recording medium conducted in the same manner as in Example 1. The CSS test was conducted under the condition of a head flying height of 1.6$\mu$ inch. The stable flying height in the CSS region continuously varied between 1.1 to 2.7$\mu$ inch in the CSS region for the magnetic recording media in all the examples.

The magnetic recording media of Examples 30 and 31 have the following characteristics. That is, since the friction between the magnetic head and the projections at the stationary position of the magnetic head causes no problem because of the small relative speed and since the area of contact between the top end of the projections and the magnetic head is extremely reduced, sticking does not occur at all even when the magnetic head stops for a long period of time.

That is, the magnetic head staying stationary on the projections of a sufficient height moves little by little to the outside of the magnetic recording medium simultaneously with the rotation of the magnetic recording medium and arrives at and rises from a radial position from 18 to 20 mm of the magnetic recording medium when the magnetic recording medium reaches a stable rotational speed (5,400 rpm). On the other hand, upon stopping, when the magnetic head is within a radial range from 20 to 21 mm of the magnetic recording medium, the number of rotation of the magnetic recording medium is lowered till the head is brought into contact with the long projections on the magnetic recording medium. Subsequently, the head is moved to a region within a radial range from 19 to 18 mm in which projections of the sufficient height are formed before the magnetic recording medium stops.

In Table 9, values for the static friction coefficient and the frictional force after 20,000 cycles of CSS are values at a radial position from 19 to 18 mm from the center of the magnetic recording medium.

TABLE 9

|  | Ex. 30 | Ex. 31 |
|---|---|---|
| Substrate linear speed (mm/s) | | |
| Short projection | 1714 | 1714 |
| Long projection | 1714 | 1714 |
| Laser intensity (mw) | | |
| Short projection | 95~220 | 95~220 |
| Long projection | 60~105 | 60~105 |
| Average irradiation time ($\mu$sec) | | |
| Short projection | 1.25 | 1.25 |
| Long projection | 3.75 | 3.75 |
| Average projection density | | |
| Short projection (N/mm$^2$) | 160 | 80 |
| Long projection (N/mm) | 20 | 20 |
| Average projection height (nm) | | |
| Short projection | 30~70 | 30~70 |
| Long projection | 5~30 | 5~30 |
| Contour line area (1) ($\mu$m$^2$) | | |
| Short projection | 0.38~0.08 | 0.38~0.08 |
| Long projection | — | — |
| Number of aperture of objective lens (NA) | | |
| Short projection | 0.6 | 0.6 |
| Long projection | 0.6 | 0.6 |
| Static friction coefficient | 0.12 | 0.11 |
| Frictional force (gf) after 20,000 cycles of CSS | 3 | 3 |

Example 32 and Comparative Examples 7–13

After applying NiP plating treatment to a thickness of 10 to 20 $\mu$m on an Al alloy substrate of 95 mm in diameter, surface polishing treatment was conducted so as to impart a surface roughness (Ra) of not more than 1 nm. Then, fabrication traces in a concentric or cross pattern were formed by mechanical polishing. An argon laser beam at 300 mW intensity was irradiated under the condition of 1714 mm/sec of a substrate linear speed and of an irradiation time of 2.5 μsec to an inner circumference portion of the NiP substrate which was a CSS region, to form projections at an average projection density of 9,260 N/mm² and an average projection height of 37 nm.

In the case of Comparative Example 12, after forming NiP plating layer at first, a concentric texture pattern was formed on the entire surface of the substrate and, further, a texture pattern at a cross angle of 30° was formed in the CSS region.

Then, an intermediate layer, a magnetic layer, a protective layer and a lubricant layer were formed successively on the substrate to produce a magnetic recording medium.

Table 10 shows the presence or absence of projections, texture patterns and difference of center line between the CSS region and data recording region for magnetic discs produced in Example 32 and Comparative Examples 7–12. The center line is according to JIS B0601-1982. Further, Table 10 shows the results of evaluation for the magnetic recording media conducted in the same manner as in Example 1. The stable flying height in the CSS region was 1.5μ inch for the magnetic recording media in all of the examples.

The number of errors in the table was measured by the following conditions. That is, the number of errors was measured at the number of rotation of the magnetic recording medium of 3,600 rpm, at a recording frequency of 10 MHz and with a recording track width of 6 μm, using a thin film had at a head gap of 0.3 μm and a head flying height of 0.07 μm. The slice level of a missing bit was defined as 65% and a bit of less than 65% was counted as an error.

TABLE 10

|  | Ex. 32 | Comp. Ex. 7 | Comp. Ex. 8 |
| --- | --- | --- | --- |
| Projection | present | absent | absent |
| Texture pattern | concentric circle | concentric circle | cross (30°) |
| Center line difference (nm) | 4 | 0 | 0 |
| Static friction coefficient | 0.18 | 0.30 | 0.20 |
| Frictional force (gf) after 20,000 cycles of CSS | 10 | 20 | 12 |
| Circumferential Hc | 1500 | 1500 | 1350 |
| Hc anisotropy | 2.0 | 2.0 | 1.8 |
| Number of errors | 5 | — | — |
|  | Comp. Ex. 9 | Comp. Ex. 10 | Comp. Ex. 11 | Comp. Ex. 12 |
| Projection | present | absent | absent | absent |
| Texture pattern | cross (30°) | cross (30°) | cross (30°) | (Note 1) |
| Center line difference (nm) | 4 | 0 | 0 | 100 |
| Static friction coefficient | 0.18 | 0.20 | 0.20 | — |
| Frictional force (gf) after 20,000 cycles of CSS | 10 | 12 | 12 | — |
| Circumferential Hc | 1350 | 1250 | 1100 | 1500 |
| Hc anisotropy | 1.8 | 1.6 | 1.3 | 2.0 |
| Number of errors | — | — | — | >100 |

Note 1: Concentric circle + Cross (30°)

Examples 33 and 34

After applying NiP sputtering to a thickness of 100 to 150 nm on a glass substrate of 95 mm in diameter, surface polishing treatment was applied so as to impart a surface roughness (Ra) of not more than 2 nm, thereby obtaining an NiP under layer on the substrate.

Then, after irradiating an argon pulse laser beam (wavelength λ: 488 μm) on the NiP layer to form projections, an intermediate layer, a magnetic layer, a protective film, and a lubricant layer were formed successively to produce a magnetic recording medium.

Table 11 shows the irradiation conditions of the laser beam and the characteristic of the resultant projections. Further, Table 11 shows the results of evaluation for the magnetic recording media conducted in the same manner as in Example 1. The CSS test was conducted under the condition of a head flying height of 1.6μ inch. The stable flying height in the CSS region was 1.2 to 1.5μ inch for the magnetic recording media in all of the examples.

TABLE 11

|  | Ex. 33 | Ex. 34 |
| --- | --- | --- |
| Substrate linear speed (mm/s) | 1714 | 1714 |
| Laser intensity (mw) | 110 | 163 |
| Average irradiation time (μsec) | 1.25 | 1.25 |
| Average projection density (N/mm²) | 9260 | 9260 |
| Average projection height (nm) | 19 | 34 |
| Melting distance (μm) | 2.5 | 2.3 |
| Number of aperture of objective lens (NA) | 0.3 | 0.6 |
| Static friction coefficient | 0.26 | 0.19 |
| Frictional force (gf) after 20,000 cycles of CSS | 10 | 8 |

Examples 35 to 38

In Example 35, an intermediate layer, a magnetic layer and a hydrogenated carbon protective layer were formed successively on a glass substrate of 95 mm in diameter and having a surface roughness (Ra) of 2 nm. In Examples 36–38, an under layer, an intermediate layer, a magnetic layer and a hydrogenated carbon protective film were formed successively on the same glass substrate as in Example 35.

Then, in each of the examples, after irradiating a laser beam from the surface of the protective layer and forming projections on the magnetic layer, a lubricant layer was formed on the surface of the protective layer. The transmittance of the laser beam to the protective layer is about 85%. Irradiation of the laser beam was conducted in air in this example and an inert atmosphere was not formed particularly.

Table 12 shows the irradiation conditions of the laser beam and the characteristic of the resultant projections. Further, Table 12 shows the results of the evaluation for the magnetic recording media conducted in the same manner as in Example 1. The CSS test was conducted under the condition of a head flying height of 1.6μ inch. The stable flying height in the CSS region was 1.2 to 1.6μ inch for the magnetic recording media in all of the examples.

TABLE 12

| | Ex. 35 | Ex. 36 | Ex. 37 | Ex. 38 |
|---|---|---|---|---|
| Substrate linear speed (mm/s) | 1600 | 1600 | 1600 | 1600 |
| Laser intensity (mw) | 110 | 113 | 110 | 90 |
| Average irradiation time ($\mu$sec) | 0.62 | 0.62 | 1.24 | 0.62 |
| Average projection density (N/mm$^2$) | 9260 | 9260 | 4630 | 9260 |
| Average projection height (nm) | 32 | 31 | 32 | 21 |
| Contour line area (1) ($\mu$m$^2$) | 0.11 | 0.14 | 0.34* | 0.23 |
| Number of aperture of objective lens (NA) | 0.6 | 0.6 | 0.6 | 0.6 |
| Injury of protective layer | none | none | none | none |
| Static friction coefficient | 0.28 | 0.31 | 0.62 | 0.38 |
| Frictional force (gf) after 20,000 cycles of CSS | 6 | 8 | 13 | 9 |

(Note) *: Cross sectional distance in a direction perpendicular to the laser beam scanning direction

Examples 39–41 and Comparative Example 14

After plating NiP (heat conductivity: about 100 Watt/mK) to a film thickness of 10 $\mu$m on an Al substrate of 95 mm in diameter, surface polishing treatment was applied so as to impart a surface roughness (Ra) of not more than 2 nm, thereby obtaining an NiP under layer on the substrate.

Then, an Ar pulse laser beam was irradiated to the CSS region in a radial range from 18 to 21 mm at an inner circumference of the substrate to form projections in a spiral pattern at 10 $\mu$m pitch on the surface of the NiP layer, under each of the conditions at a laser beam intensity of 163 mW, for an average irradiation time of 0.6 $\mu$sec at a substrate linear speed of 1714 m/sec, with a spot diameter (1.22 $\lambda$/NA) of 1.0 $\mu$m to which 84% of energy (1/e$^2$) is concentrated (wherein NA represents the number of aperture of a condensing objective lens of the laser beam). The wavelength of the Ar pulse laser beam used was at 488 nm.

After forming the projections by the laser beam, mechanical texture was formed on the surface of the NiP layer circumferentially to the substrate surface so as to impart a polishing amount as described in Table 13 by using a free diamond grinding particles of about 1 $\mu$m grain size.

Then, an intermediate layer, a magnetic layer, a protective layer and a lubricant layer were successively formed on the NiP layer to produce a magnetic recording medium.

Table 13 shows the irradiation conditions of the laser beam and the characteristic of the resultant projection. Further, Table 13 shows the results of evaluation for the magnetic recording media conducted in the same manner as in Example 1. The CSS test was conducted under the condition of a head rising amount of 1.6$\mu$ inch. The stable flying height in the CSS region was 1.4$\mu$ inch for the magnetic recording media in all of the examples.

TABLE 13

| | Ex. 39 | Ex. 40 | Ex. 41 | Comp. Ex. 13 |
|---|---|---|---|---|
| Substrate linear speed (mm/s) | 1714 | 1714 | 1714 | 1714 |
| Laser intensity (mw) | 163 | 163 | 163 | 163 |
| Average irradiation time ($\mu$sec) | 0.6 | 0.6 | 0.6 | 0.6 |

TABLE 13-continued

| | Ex. 39 | Ex. 40 | Ex. 41 | Comp. Ex. 13 |
|---|---|---|---|---|
| Average projection density (N/mm$^2$) | 9260 | 9260 | 9260 | 9260 |
| Average projection height (nm) | 30 | 30 | 25 | 35 |
| Number of aperture of objective lens (NA) | 0.6 | 0.6 | 0.6 | 0.6 |
| Grinding amount (mg/cm$^2$) | 0.03 | 0.03 | 0.03 | — |
| <Normal temperature, normal humidity> | | | | |
| Static friction coefficient | 0.18 | 0.24 | 3.25 | 0.19 |
| Frictional force (gf) after 20,000 cycles of CSS | 7 | 10 | 25 | 8 |
| <Temperature 25° C., humidity 70%> | | | | |
| Static friction coefficient | 0.20 | 0.27 | 5.15 | 0.25 |
| Frictional force (gf) after 20,000 cycles of CSS | 6 | 8 | 34 | 21 |

Example 42, Comparative Example 14

Mechanical texture treatment was applied to an Al substrate having 95 mm in diameter and coated with an NiP under layer, so as to impart a surface roughness (Ra) of not more than 2 nm.

Then, after irradiating a laser beam and forming projections on the NiP layer, an intermediate layer, a magnetic layer, a protective layer and a lubricant layer were formed successively to produce a magnetic recording medium.

The projections were formed as below. That is, a radial range from 21 to 9 mm from the center of the substrate was defined as the CSS region. The intensity of the laser beam was changed from 165 mW to 260 mW as the radial distance from the center of the substrate was reduced, to decrease the height of the projections toward the outer circumferential direction of the substrate.

In Comparative Example 14, after applying texture to impart Ra of about 2 nm by a conventional mechanical texture method, not applying irradiation of the laser beam, to an Al substrate having 95 nm in diameter coated with the NiP under layer, an intermediate layer, a magnetic layer, a protective film and lubricant layer were formed successively.

Table 14 shows the irradiation conditions of the laser beam and the characteristic of the resultant projection. Further, Table 14 shows the results of evaluation for the magnetic recording media conducted in the same manner as in Example 1. The CSS test was conducted under the condition of a head flying height of 1.6$\mu$ inch. The stable flying height in the CSS region varied continuously between 1.1 to 2.4$\mu$ inch.

In the magnetic recording medium in Example 42, the stopping position for the magnetic head is within a radial range from 19 to 20 mm of the magnetic recording medium, the magnetic head moves little by little to the outward simultaneously with the rotation of the magnetic recording medium, and the magnetic head arrives at and rises from a radial position from 20 to 21 mm when the magnetic recording medium reaches a stable rotational speed (5,400 rpm). On the contrary, when the magnetic head is to be stopped, the number of rotation of the magnetic recording medium is lowered in a state where the magnetic head situates in a radial range from 20 to 21 mm till the magnetic head is brought in to contact with the projections of the magnetic recording medium. Subsequently, the magnetic head is moved to a radial position from 19 to 20 mm before the magnetic recording medium stops. Accordingly, values for the static friction coefficient and the frictional force (gf) after 20,000 cycles of CSS in Table 14 show values at a radial positions of 19 to 20 mm.

From the results of evaluation for the magnetic recording media shown in Table 14, it can be seen that since the height of the projections varies continuously in the CSS region, the magnetic recording medium in Example 42 causes neither sticking nor head crush. On the contrary, in the case of the magnetic recording medium in Comparative Example 14, driving was stopped by adsorption at 750 cycles of the CSS test.

TABLE 14

|  | Ex. 42 |
| --- | --- |
| Substrate linear speed (mm/s) | 1714 |
| Laser intensity (mw) | 1650~260 |
| Average irradiation time ($\mu$sec) | 1.25 |
| Average projection density (N/mm$^2$) | 9260 |
| Average projection height (nm) | 5~56 |
| Contour line area (1) ($\mu$m$^2$) | 0.38~0.08 |
| Number of aperture of objective lens (NA) | 0.6 |
| Static friction coefficient | 0.12 |
| Frictional force (gf) after 20,000 cycles of CSS | 3 |

According to the magnetic recording medium and the method therefor in accordance with the present invention, the following advantageous effects can be provided.

(1) An area of contact between the lower surface of the magnetic head and the surface of the magnetic recording medium is reduced, thereby extremely decreasing the friction upon CSS operation and, further, sticking of the magnetic head to the surface of the magnetic recording medium can also be prevented.

(2) Even in a case of forming the projections only in the CSS region of the magnetic head, the average height of the surface is substantially equal between the data recording region and the CSS region by applying mechanical texture uniformly to each of the regions. Therefore, when the magnetic head seeks between the data recording region and the CSS region, the stable flying height of the magnetic head less fluctuates, causing neither head crush nor instabilization of the head in the space.

(3) Since the height of projections or the density of projections can be controlled as they approach to the data recording region, magnetic head can seek between the data recording region and the CSS region extremely smoothly. In this case, since there is no requirement for forming deep surface flaws by mechanical texture for the improvement of CSS in the data recording region, the flying height of the magnetic head can be reduced and date errors due to the surface flaws can also be reduced.

(4) The time requiring for forming the projections can be shortened in a case of utilizing a property that the CSS characteristic does not deteriorate so much even if the density of projections in the circumferential direction of the magnetic recording medium is made somewhat greater and the density of projections in the circumferential direction is reduced.

(5) In a case of where sharp projections having a horizontal crescent or half moon-like cross section are formed relative to the running direction of the magnetic head, degradation of the CSS characteristic under high temperature and high humidity can be made moderate.

(6) Also in a case of where projections each having an sharp top end of a projection having a horizontal substantial circular cross section are formed, the degradation of the CSS characteristic under high temperature and high humidity can also be moderated.

(7) In a case of where long projections having an aspect ratio of not less than 3 in a bottom cross section of the projection and short projections having an aspect ratio of more than 1 and less than 3 in a bottom cross section of the projection are formed, wearing or abrasion at the top ends of the projections on the surface of the magnetic recording medium caused upon high speed rotation relative to the magnetic head can be suppressed by the long projections, and the durability of the projections, that is, the durability of the magnetic recording medium can be improved.

(8) In a case of applying concentric mechanical grinding to the data recording region which is advantageous to the recording characteristics, the recording characteristics are satisfactory. In addition, since a step between the CSS region and data recording region is small, errors are also reduced. Accordingly, the CSS characteristic and the recording/reading-out characteristic which were in a trade off relationship in the prior art can be made compatible.

(9) Since projections can be formed on the surface of the magnetic recording medium by irradiating the laser beam through the lubricant layer, the protective layer or both of the layers, and locally melting or softening the surface of the magnetic layer, under layer or the substrate, the producing steps for the magnetic recording medium can be simplified.

(10) In a case of roughening the top of the projections formed by the irradiation of the laser beam by the mechanical texture, since the area of contact between the lower surface of the magnetic head and the surface of the magnetic recording medium is further reduced, friction upon CSS is extremely reduced and no sticking of the magnetic head to the surface of the magnetic recording medium occurs at all. Particularly, stable CSS characteristics are exhibited also in a circumstantial test under high temperature and high humidity.

Further, according to the recording/reading-out method of the present invention, since the stable flying height of the magnetic head can be reduced in the data recording region to such an extent as defined by the glide in the data recording region, and since the magnetic head can be stopped on the projections of a moderate height so as not to cause sticking, a high density magnetic recording device causing no sticking can be developed.

What is claimed is:

1. A recording/reading-out method of writing and reading data to and from a magnetic disc by a magnetic head by a contact start and stop (CSS) system, wherein the magnetic disc has projections in a CSS region in which the magnetic head conducts a CSS operation, the height of the projections being reduced toward a data recording region of the magnetic disc, said recording/reading-out method comprises the steps of:

rising the magnetic head from the magnetic disc, in preparation of performing one of a writing and reading data to and from the magnetic disc, in the CSS region whereat the projections at a height lower than the average height of the projections are present or in the CSS region with no presence of projections neighboring a region in which the projections are present;

lowering the magnetic head to the magnetic disc, following performing one of a writing and reading data to and from the magnetic disc, in the CSS region whereat the projections at a height lower than the average height of the projections are present or in the CSS region with no Presence of projections neighboring a region in which the projections are present; and stopping the magnetic head stationary in the CSS region whereat projections each having a height greater than the average height of the projections are present.

2. A recording/reading-out method according to claim 1, wherein the maximum height of the projections is not more than 200 nm, the density of the projections is from 10 to $10^6$ Numbers/mm$^2$, and the radial average slope of the projection height from the inner circumference to the outer circumference of the magnetic disc is not more than 0.0001.

3. A recording/reading-out method according to claim 1, wherein the average area for a cross-section formed by a contour line 1 nm below the top of each of the projections is not more than 2 $\mu$m$^2$.

4. A recording/reproducing method according to claim 1, which further comprises:

the magnetic head stops stationary in the CSS region;

the magnetic head moves to the data recording region side of the CSS region with the increase of number of rotation of the magnetic disc when the disc starts to rotate;

the magnetic head moves on the data recording region;

the magnetic head moves from the data recording region to the CSS region when the disc stops rotating;

the magnetic head moves to the non-data recording region side in the CSS region with the decrease of number of rotation of the magnetic disc; and the magnetic head stops stationary in the non-data recording region side of the CSS region.

5. A recording/reproducing method of reading and writing data from and to a magnetic disc by a magnetic head by a contact start and stop (CSS) system, wherein the magnetic disc has protrusions in a CSS region in which the magnetic head conducts a CSS operation, the height of the protrusions being uniform toward a data recording region of the magnetic disc, said recording/reproducing method comprising the steps of:

rising the magnetic head in preparation of performing one of writing and reading data to and from the magnetic disc in the data recording region side of the CSS region;

lowering the magnetic head following performing one of writing and reading data to and from the magnetic disc in the data recording region side of the CSS region; and stopping the magnetic head stationary in the non-data recording region side of the CSS region based on the region where the magnetic head lowers and rises to and from the magnetic disc.

6. A recording/reproducing method according to claim 5, which further comprises:

the magnetic head stops stationary in the CSS region, the magnetic head moves to the data recording region side of the CSS region with the increase of number of rotation of the magnetic disc when the disc starts to rotate;

the magnetic head moves on the data recording region;

the magnetic head moves from the data recording region to the CSS region when the disc stops rotating;

the magnetic head moves to the non-data recording region side in the CSS region with the decrease of number of rotation of the magnetic disc; and the magnetic head stops stationary in the non-data recording region side of the CSS region.

* * * * *